United States Patent
Nakamoto et al.

(10) Patent No.: US 10,159,938 B2
(45) Date of Patent: Dec. 25, 2018

(54) HOLLOW FIBER MEMBRANE MODULE AND METHOD FOR PRODUCING THE SAME

(71) Applicant: ASAHI KASEI KABUSHIKI KAISHA, Tokyo (JP)

(72) Inventors: Kohei Nakamoto, Tokyo (JP); Naoyuki Shinohara, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 15/514,228

(22) PCT Filed: Aug. 19, 2015

(86) PCT No.: PCT/JP2015/004125
§ 371 (c)(1),
(2) Date: Mar. 24, 2017

(87) PCT Pub. No.: WO2016/051647
PCT Pub. Date: Apr. 7, 2016

(65) Prior Publication Data
US 2017/0282126 A1    Oct. 5, 2017

(30) Foreign Application Priority Data

Sep. 30, 2014    (JP) .................................. 2014-202437

(51) Int. Cl.
*B01D 53/22* (2006.01)
*B01D 63/02* (2006.01)

(52) U.S. Cl.
CPC ......... *B01D 63/023* (2013.01); *B01D 63/022* (2013.01); *B01D 63/024* (2013.01)

(58) Field of Classification Search
CPC .. B01D 63/021; B01D 63/024; B01D 63/023; B01D 63/022; B01D 2271/00; B01D 63/02
See application file for complete search history.

(56) References Cited

U.S. PATENT DOCUMENTS 3,422,008 A * 1/1969 McLain ................. B01D 53/22
                                                  210/321.74
3,944,485 A * 3/1976 Rembaum ............ B01D 61/243
                                                  210/638

(Continued)

FOREIGN PATENT DOCUMENTS

JP         49-3910       1/1974
JP         59-22606      2/1984

(Continued)

OTHER PUBLICATIONS

Search Report issued in European Patent Office (EPO) Patent Application No. 15847685.3, dated Jul. 24, 2017.

(Continued)

*Primary Examiner* — Anthony R Shumate
(74) *Attorney, Agent, or Firm* — Greenblum & Bernstein, P.L.C.

(57) ABSTRACT

A module includes a bonded portion in which the hollow-fiber-membranes are bonded and fixed together by potting material at least in an end portion of each of the hollow-fiber-membranes. Each of the hollow-fiber-membranes has a resin impregnation portion in which resin is impregnated into an outer surface side of each of the hollow-fiber-membranes at least in the end portion where each of the hollow-fiber-membranes is bonded and fixed together. In the end portion of the hollow-fiber-membranes, a leading edge of the resin impregnation portion toward the other end of each of the hollow-fiber-membranes is located closer to the other end than a leading edge of the bonded portion toward (Continued)

the other end. The thickness of the resin impregnation portion in the direction of the wall thickness of the hollow-fiber-membranes is 10 to 70% with respect to the thickness of the hollow-fiber-membranes.

18 Claims, 10 Drawing Sheets

(56) References Cited

U.S. PATENT DOCUMENTS

| | | | | | |
|---|---|---|---|---|---|
| 4,311,661 | A | * | 1/1982 | Palmer | B29C 70/44 264/102 |
| 4,361,455 | A | * | 11/1982 | Arterburn | F16L 11/086 156/149 |
| 5,201,979 | A | * | 4/1993 | Koba | B29C 70/504 100/212 |
| 5,639,368 | A | * | 6/1997 | Davis | B01D 61/425 204/210 |
| 6,290,756 | B1 | * | 9/2001 | Macheras | B01D 53/22 156/294 |
| 6,582,496 | B1 | * | 6/2003 | Cheng | B01D 53/22 95/45 |
| 2005/0103423 | A1 | * | 5/2005 | Ide | B01D 63/022 156/64 |
| 2006/0012028 | A1 | * | 1/2006 | Usui | H01L 23/49894 257/700 |
| 2006/0035548 | A1 | * | 2/2006 | Goto | B29B 15/122 442/65 |
| 2010/0276355 | A1 | | 11/2010 | Kashihara | |
| 2011/0204534 | A1 | * | 8/2011 | Kanemasu | B29C 43/12 264/36.1 |
| 2012/0074054 | A1 | | 3/2012 | Burr et al. | |
| 2014/0216138 | A1 | | 8/2014 | Shibata et al. | |
| 2015/0174533 | A1 | * | 6/2015 | Li | B01D 53/22 95/45 |
| 2015/0217235 | A1 | * | 8/2015 | Yamaoka | B01D 53/22 96/8 |
| 2015/0252160 | A1 | * | 9/2015 | Teranishi | C08J 5/24 428/413 |
| 2017/0050148 | A1 | * | 2/2017 | Taniguchi | B01D 63/04 |

FOREIGN PATENT DOCUMENTS

| | | |
|---|---|---|
| JP | 61-141903 | 6/1986 |
| JP | 3-15631 | 2/1991 |
| JP | 2003-93850 | 4/2003 |
| JP | 2009-165913 | 7/2009 |
| JP | 2013-208544 | 10/2013 |
| JP | 2014-226618 | 12/2014 |
| WO | 2013/031968 | 3/2013 |

OTHER PUBLICATIONS

Search Report issued in International Bureau of WIPO Patent Application No. PCT/JP2015/004125, dated Dec. 28, 2015.
English language translation of international Preliminary Report on Patentability received in PCT/JP2015/004125, dated Apr. 13, 2017.

* cited by examiner

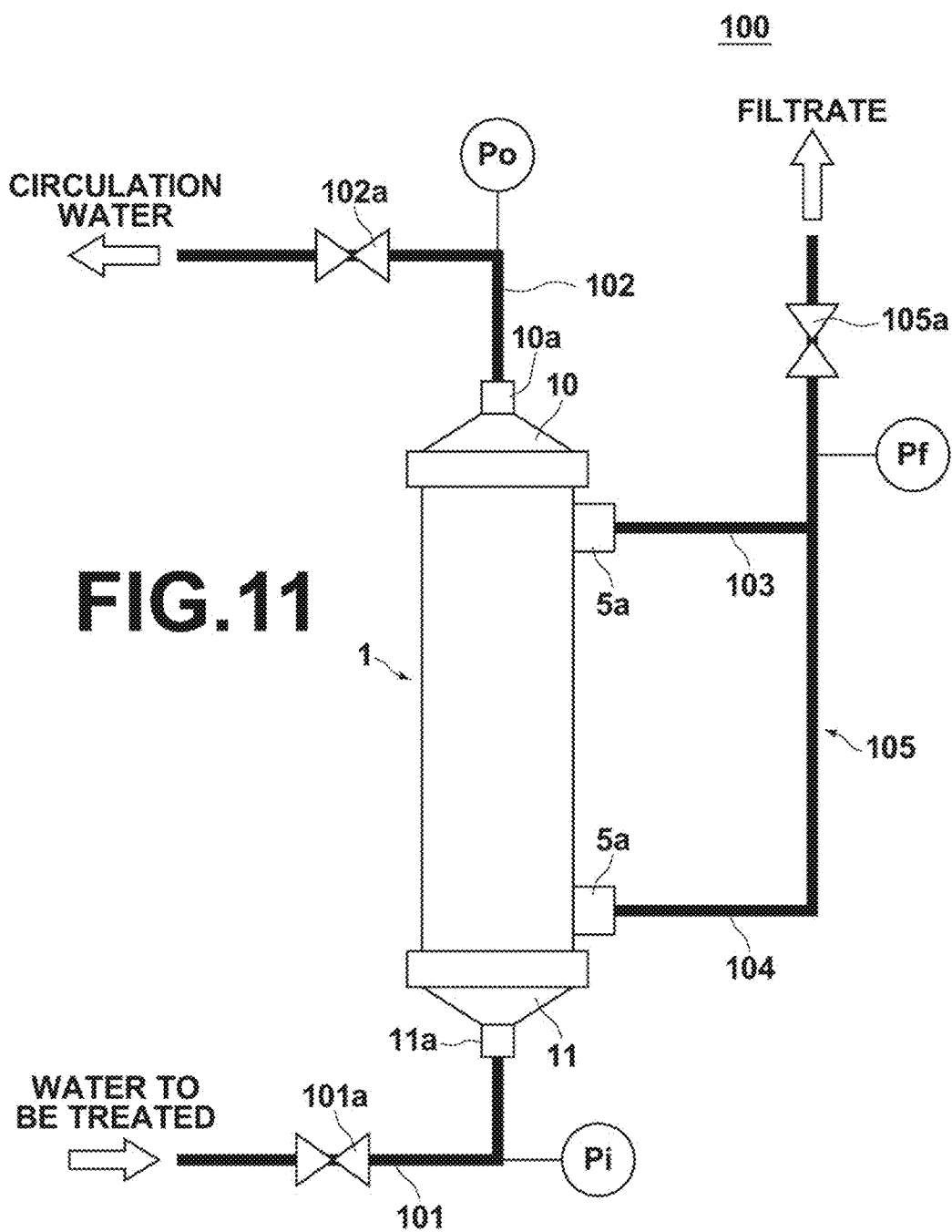

HOLLOW FIBER MEMBRANE MODULE AND METHOD FOR PRODUCING THE SAME

BACKGROUND OF THE INVENTION

Field of the Invention

The present disclosure relates to a hollow fiber membrane module including a hollow fiber membrane bundle composed of plural hollow fiber membranes bundled together and a method for producing the same. In particular, the present disclosure relates to a process performed on an end portion of the hollow fiber membrane module where hollow fiber membranes are bonded together.

Description of the Related Art

In the fields of semiconductor production, food industries and the like, hollow fiber membrane modules, in which hollow fiber membrane bundles composed of plural hollow fiber membranes bundled together are housed in casings, are widely used for gas-liquid absorption, degasification, filtration and the like. This hollow fiber membrane module is constituted by hollow fiber membranes integrated by fixing their end portions together by potting material. As the hollow fiber membrane, a membrane made of porous fluorine resin is widely used. Since a hollow fiber membrane module using hollow fiber membranes has a large membrane area, and can reduce the size of an apparatus, the hollow fiber membrane module is used in various fields.

However, regarding such a hollow fiber membrane module, there are various problems, as will be described below.

When filtration is performed by using the hollow fiber membrane module as described above, or this hollow fiber membrane module is washed by backwash, hollow fiber membranes scrape against each other, and are damaged. Therefore, liquid to be processed leaks at the damaged part. In particular, a strong stress is applied to a portion in which the hollow fiber membrane bundle is bonded and fixed by potting material. Therefore, the hollow fiber membrane is damaged, and as a result, a leakage occurs.

Meanwhile, in some cases, the size of pores formed on the hollow fiber membrane is increased to improve the permeability during filtration. When plural hollow fiber membranes having such large pores are bundled, and end portions of the hollow fiber membranes are bonded and fixed by potting material, the potting material enters a hollow portion of the hollow fiber membrane through such pores because the size of the pores is large, and the hollow portion is clogged by the potting material. As a result, it becomes impossible to pass liquid to be processed into the hollow portion. Therefore, filtration is not possible.

Further, the potting material penetrates into a wall portion of the hollow fiber membrane. Therefore, while the potting material is cured, the temperature of heat generated in a portion where the hollow fiber membranes are bonded and fixed together becomes high. Therefore, a crack is generated in the potting material during cure. Further, a residual stress in the bonded and fixed portion after cure becomes large.

As a means for solving such a problem, for example, Japanese Unexamined Patent Publication No. 2009-165913 (Patent Document 1) discloses a hollow fiber membrane module in which penetration of potting material into the wall portion is prevented by impregnating low hardness resin into an end portion of the hollow fiber membrane in advance. The hollow fiber membrane module has a structure that secures flexibility in the vicinity of a bottom portion of the hollow fiber membrane with respect to a bonded and fixed portion, and is not easily damaged during use.

Here, as a method for preventing a leakage of liquid to be processed in the vicinity of the bottom portion of the hollow fiber membrane, a technique in which a protective layer against a bonded portion is formed in the vicinity of the bottom portion of the hollow fiber membrane by using low hardness resin, and thereby the durability of the hollow fiber membrane in the vicinity of the bottom portion of the hollow fiber membrane is increased is known (please refer, for example, to Japanese Unexamined Patent Publication No. 2003-093850 (Patent Document 2)).

Further, as a method for preventing a hollow portion of the hollow fiber membrane from being clogged when hollow fiber membranes having large pore diameters are bonded and fixed, a method in which the surfaces of end portions of the hollow fiber membranes are coated with resin having low viscosity before the end portions are bonded and fixed together is also known (please refer, for example, to Japanese Unexamined Patent Publication No. 61(1986)-141903 (Patent Document 3)).

SUMMARY OF THE INVENTION

However, in Patent Document 1, a length from an end surface of the hollow fiber membrane to a leading edge of a portion of the hollow fiber membrane into which resin has been impregnated in advance and a length from the end surface of the hollow fiber membrane to a leading edge of an bonded portion in which hollow fiber membranes are bonded together are the same. Therefore, for example, when the hollow fiber membranes swing by water current during filtration and backwash operations, a stress is concentrated in the vicinity of a bottom portion of the hollow fiber membrane against a bonded and fixed portion. Therefore, a fracture of the hollow fiber membrane occurs in some cases. Specifically, a risen portion in which the potting material has crept up along the outer surface of the hollow fiber membrane is formed, and the thickness of this risen portion gradually becomes thinner toward the leading edge. Therefore, this leading edge tends to damage the outer surface of the hollow fiber membrane. The risen portion will be described later in detail.

In view of the foregoing circumstances, the present disclosure is directed to providing a hollow fiber membrane module that prevents penetration of potting material into a wall portion of a hollow fiber membrane and also damage to the hollow fiber membrane in the vicinity of a bottom portion of the hollow fiber membrane against a bonded and fixed portion, and a method for producing the same.

A hollow fiber membrane module of the present disclosure includes a hollow fiber membrane bundle composed of plural hollow fiber membranes bundled together. The hollow fiber module includes a bonded portion in which the hollow fiber membranes are bonded and fixed by potting material at least in an end portion of each of the hollow fiber membranes. Each of the hollow fiber membranes has a resin impregnation portion in which resin is impregnated into an outer surface side of each of the hollow fiber membranes at least in the end portion where each of the hollow fiber membranes is bonded and fixed. A leading edge of the resin impregnation portion toward the other end of each of the hollow fiber membranes is located closer to the other end than a leading edge of the bonded portion toward the other end in the end portion of each of the of hollow fiber membranes. Further, the thickness of the resin impregnation portion in the direction of the wall thickness of the hollow fiber membrane is 10 to 70% with respect to the thickness of the hollow fiber membrane.

Further, it is desirable that a difference between the glass transition temperature of the potting material and the glass transition temperature of the resin forming the resin impregnation portion is 0° C. or higher and 10° C. or lower.

Further, it is desirable that the glass transition temperature of the potting material and the resin forming the resin impregnation portion is 70° C. or higher.

Further, it is desirable that the potting material and the resin forming the resin impregnation portion include at least one of epoxy resin, vinyl ester resin, urethane resin, unsaturated polyester resin, olefinic polymer, silicone resin, and fluorine-containing resin.

Further, it is desirable that the potting material is epoxy resin, and the resin forming the resin impregnation portion is the same as the potting material.

Further, it is desirable that a distance between the leading edge of the bonded portion toward the other end and the leading edge of the resin impregnation portion toward the other end is 1 cm or longer in arithmetic mean, and 1 cm or longer and 5 cm or shorter in arithmetic mean is more desirable.

In the plural hollow fiber membranes, it is desirable that an average pore diameter on an inner surface of the hollow fiber membrane is 1 to 50 μm, and a blocking pore diameter of the hollow fiber membrane is 0.1 to 1 μm, and that average pore diameter Pa of region a, average pore diameter Pb of region b and average pore diameter Pc of region c satisfy the following relationship:

$$Pa<Pb<Pc,$$

where a region including an outer surface of the hollow fiber membrane is region a, a region including an inner surface of the hollow fiber membrane is region c, and a region between region a and region c is region b, in a case where the hollow fiber membrane is divided into three equal regions a to c in the direction of its membrane thickness from its outer surface toward its inner surface.

A method for producing a hollow fiber membrane module of the present disclosure is a method for producing a hollow fiber membrane module including a hollow fiber membrane bundle composed of plural hollow fiber membranes bundled together. The method for producing includes a preliminary step before bonding, in which a resin impregnation portion is formed in an outer surface side of each of the hollow fiber membranes by dipping at least an end portion of each of the hollow fiber membranes in resin solution obtained by diluting resin with organic solvent, and after then by drying the dipped portion, and a bonding step, in which a bonded portion is formed after the preliminary step before bonding by bonding and fixing the end portion including the resin impregnation portion of each of the hollow fiber membranes together by potting material. Further, the concentration of resin in the resin solution used in the preliminary step before bonding is 10 to 70 mass %. In the bonding step, the bonded portion is formed in such a manner that a leading edge of the resin impregnation portion toward the other end of each of the hollow fiber membranes is located closer to the other end than a leading edge of the bonded portion toward the other end in the end portion of each of all the hollow fiber membranes.

In the method for producing a hollow fiber membrane module of the present disclosure, it is desirable that a difference between the glass transition temperature of the potting material and the glass transition temperature of the resin forming the resin impregnation portion is 0° C. or higher and 10° C. or lower.

Further, it is desirable that the glass transition temperature of the potting material and the resin forming the resin impregnation portion is 70° C. or higher.

Further, it is desirable that the potting material and the resin forming the resin impregnation portion include at least one of epoxy resin, vinyl ester resin, urethane resin, unsaturated polyester resin, olefinic polymer, silicone resin, and fluorine-containing resin.

Further, it is desirable that the potting material is epoxy resin, and the resin forming the resin impregnation portion is the same as the potting material.

In the bonding step, it is desirable that a distance between the leading edge of the bonded portion toward the other end and the leading edge of the resin impregnation portion toward the other end is 1 cm or longer in arithmetic mean, and 1 cm or longer and 5 cm or shorter in arithmetic mean is more desirable.

Further, it is desirable to use alcohol, as the organic solvent.

Further, it is desirable to use ethanol, 1-butanol or a mixture thereof, as the organic solvent.

In plural hollow fiber membranes, it is desirable that an average pore diameter on an inner surface of the hollow fiber membrane is 1 to 50 μm, and a blocking pore diameter of the hollow fiber membrane is 0.1 to 1 μm, and that average pore diameter Pa of region a, average pore diameter Pb of region b and average pore diameter Pc of region c satisfy the following relationship:

$$Pa<Pb<Pc,$$

where a region including an outer surface of the hollow fiber membrane is region a, a region including an inner surface of the hollow fiber membrane is region c, and a region between region a and region c is region b, in a case where the hollow fiber membrane is divided into three equal regions a to c in the direction of its membrane thickness from its outer surface toward its inner surface.

According to the hollow fiber membrane module and a method for producing the same of the present disclosure, when a bonded portion is formed by bonding and fixing an end portion of each of hollow fiber membranes, in which a resin impregnation portion has been formed, together by potting material, a leading edge of the resin impregnation portion toward the other end of each of the hollow fiber membranes is located closer to the other end than a leading edge of the bonded portion toward the other end. Therefore, for example, when filtration or washing by backwash is performed on the hollow fiber membrane module, it is possible to prevent damage to the vicinity of a bottom portion of the hollow fiber membrane, caused by contact of the leading edge of the bonded portion with the outer surface of the hollow fiber membrane in the vicinity of the bottom portion.

BRIEF DESCRIPTION OF THE DRAWINGS

FIG. 11 is a schematic diagram illustrating the configuration of a filtration apparatus using an embodiment of a hollow fiber membrane module of the present disclosure.

DETAILED DESCRIPTION OF THE PREFERRED EMBODIMENTS

Hereinafter, an embodiment of a hollow fiber membrane module of the present disclosure will be described with reference to drawings. The hollow fiber membrane module according to the present embodiment is applicable to various fields, such as water and sewage, food industries, general manufacturing, medicine, and physics and chemistry.

Figure 1:
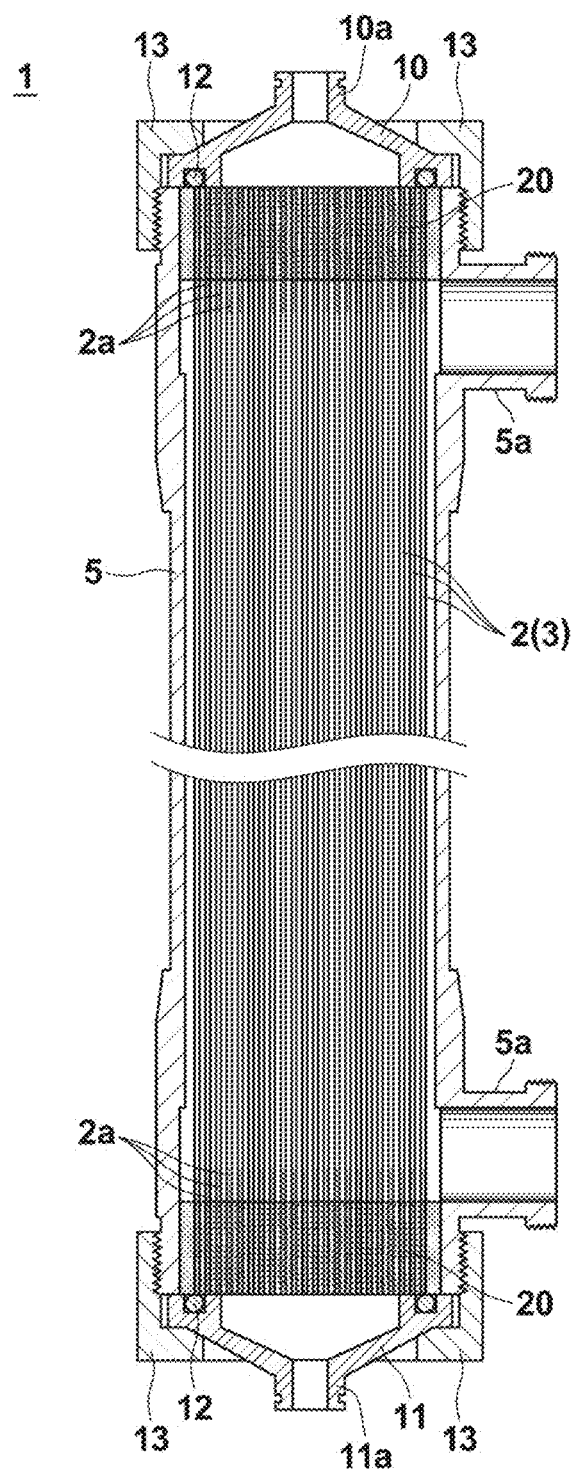
FIG. 1 is a cross section illustrating the structure of an embodiment of a hollow fiber membrane module of the present disclosure.

As illustrated in FIG. 1, a hollow fiber membrane module 1 according to the present embodiment includes a hollow fiber membrane bundle 3 composed of plural hollow fiber membranes 2 bundled together and a cylindrical casing 5 for housing the hollow fiber membrane bundle 3.

Caps 10, 11 for connecting piping, in which tubular channels 10a, 11a to which piping is to be connected are formed, are provided at openings of both ends of the casing 5. The caps 10, 11 for connecting piping are fixedly attached to the casing 5 by nuts 13. The nuts 13 are screwed onto male screws formed on side surfaces at both ends of the casing 5. When these nuts 13 are tightened, the two ends of the casing and the caps 10, 11 are sealed each other by O-rings 12 arranged in grooves of the caps 10, 11.

Further, nozzles 5a, through which fluid flows, are formed in both end portions of the casing 5. The nozzles 5a are provided in such a manner to project in a direction orthogonal to the longitudinal direction of the casing 5.

Figure 2:
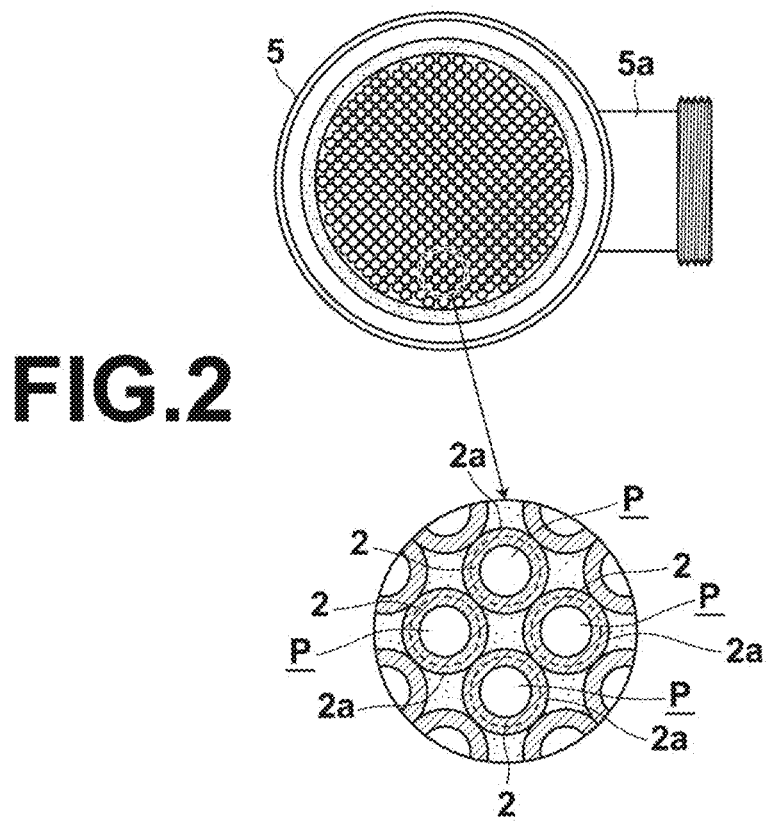
FIG. 2 is a diagram illustrating an end surface of a hollow fiber membrane bundle.

FIG. 2 is a diagram illustrating an end surface of the hollow fiber membrane bundle 3 housed in the casing 5 in a state before attachment of the caps 10, 11 and its partial enlarged diagram. As illustrated in FIG. 2, hollow fiber membranes 2 having openings P are arranged and a bonded portion 20 (please refer to FIG. 1) is formed by filling a space between the hollow fiber membranes 2 with potting material at both end surfaces of the hollow fiber membrane bundle 3.

Fluid that has flowed in through the tubular channels 10a, 11a of the caps 10, 11 passes through only a hollow portion in each of the hollow fiber membranes 2 without leaking to an area between the hollow fiber membranes 2 because of the bonded portions 20 are present in the aforementioned structure. Fluid that has permeated out from each of the hollow fiber membranes 2 through their outer surface between the two bonded portions 20, located in the two end portions, flows out from the nozzle 5a, or fluid that has flowed in from the nozzle 5a penetrates into each of the hollow fiber membranes 2 through their outer surface between the bonded portions 20, in the two end portions, and the fluid that has passed through a hollow portion of each of the hollow fiber membranes 2 flows out from the tubular channels 10a, 11a of the caps 10, 11.

As the hollow fiber membrane 2, a microfiltration membrane, an ultrafiltration membrane or the like may be used. The material of the hollow fiber membrane is not particularly limited. Examples of the material are polysulfones, polyethersulfones, polyacrylonitriles, polyimides, polyetherimides, polyamides, polyetherketones, polyether ether ketones, polyethylenes, polypropylene, poly(4-methyl-1-pentene), ethylene-vinyl alcohol copolymers, cellulose, cellulose acetate, polyvinylidene fluoride, ethylene-tetrafluoroethylene copolymers, polytetrafluoroethylene and the like, and composite materials thereof may also be used.

The inner diameter of the hollow fiber membrane 2 is from 50 µm to 3000 µm, and desirably from 500 µm to 2000 µm. When the inner diameter is small, a pressure drop becomes large, and that gives an adverse effect to filtration. Therefore, it is desirable that the inner diameter of the hollow fiber membrane 2 is 50 µm or greater. Further, when the inner diameter is large, it becomes difficult to maintain the shape of a membrane during spinning. Therefore, it is desirable that the inner diameter is 3000 µm or less. Further, it is desirable that an average pore diameter on the inner surface of the hollow fiber membrane 2 is from 1 to 50 µm. It is desirable that a blocking pore diameter is from 0.1 to 1 µm. Further, it is desirable that average pore diameter Pa of region a, average pore diameter Pb of region b and average pore diameter Pc of region c satisfy the relationship of Pa<Pb<Pc, when a region including an outer surface of the hollow fiber membrane 2 is regarded as region a, a region including an inner surface of the hollow fiber membrane 2 is region c, and a region between region a and region c is regarded as region b, in a case where the hollow fiber membrane 2 is divided into three equal regions a to c in the direction of its membrane thickness from its outer surface toward its inner surface.

Meanwhile, the number of hollow fiber membranes 2 in the hollow fiber membrane bundle 3 is, for example, about 3000 in the case that the hollow fiber membrane bundle 3 having the diameter of 150 mm is formed.

Resin impregnation portions 2a, which are formed by impregnating resin into the outer surface side of each of the hollow fiber membranes 2, are provided in both end portions of each of the hollow fiber membranes 2. When the resin impregnation portions 2a are provided, it is possible to prevent obstruction of the hollow portion of the hollow fiber membrane 2, caused by entrance of potting material into the hollow portion through pores of the hollow fiber membrane 2. Further, while filtration or washing by backwash is performed in the hollow fiber membrane module 1, it is possible to prevent damage to the vicinity of a bottom portion of the hollow fiber membrane 2, caused by contact of a leading edge of the bonded portion 20 with the outer surface of the hollow fiber membrane 2 in the vicinity of the bottom portion.

The resin used to form the resin impregnation portion 2a should be absorbed toward the inside of the hollow fiber membrane 2 by being diluted with organic solvent. For example, epoxy resin and urethane resin may be used. In a case where epoxy resin is used, novolak-based epoxy resin, bisphenol-A-based resin, bisphenol-F-based resin, alicyclic epoxy resin, biphenyl-based epoxy resin, brominated epoxy resin and the like may be used as a main agent. Aliphatic polyamine, aromatic polyamine, polyamideamine, acid-anhydride-based resin and the like may be used as a curing agent. Further, ether-based urethan resin and ester-based urethan resin may be used as urethan resin. A method for forming the resin impregnation portion 2a will be described later in detail.

As the potting material, macromolecular material, such as epoxy resin, vinyl ester resin, urethane resin, unsaturated polyester resin, olefinic polymer, silicone resin, and fluorine-containing resin, is desirable. The material of the potting material may be one of these macromolecular materials, or a combination of plural macromolecular materials thereof. It is necessary that the potting material has pressure resistance that can tolerate a differential pressure between a primary side and a secondary side induced by pressurization during filtration. Therefore, the potting material needs to have appropriate hardness.

It is desirable that a difference between the glass transition temperature of resin for forming the resin impregnation portion 2a and the glass transition temperature of resin used as the potting material is 0° C. or higher and 10° C. or lower. It is possible to firmly bond the resin used to form the resin impregnation portion 2a and the resin used as the potting material together by setting the difference in glass transition temperature to 10° C. or lower. Further, it is desirable that the glass transition temperature of the resin for forming the resin impregnation portion 2a and the resin used as the potting material is 70° C. or higher. It is possible to maintain sufficient durability by using resin having such a glass transition temperature when hot water washing is performed by using water or an agent, such as acid and alkali, at about 70° C. Further, it is desirable that the resin used to form the resin impregnation portion 2a and the resin used as the potting material are the same. Required bond strength is maintainable by using the same resin, because sufficient intermolecular force acts.

Figure 3:
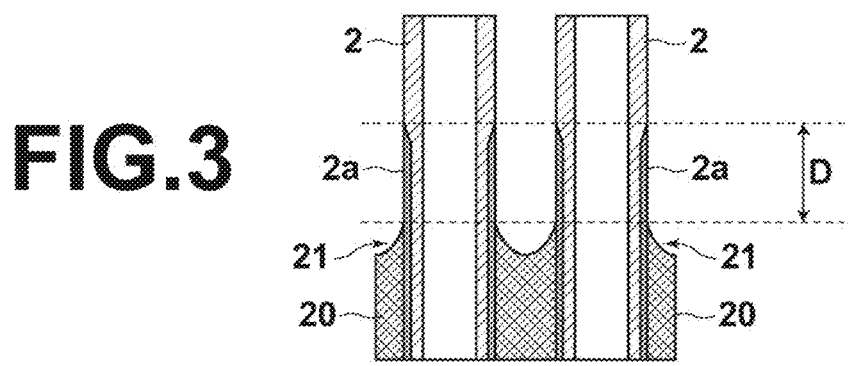
FIG. 3 is a diagram for explaining a positional relationship between a leading edge of a resin impregnation portion and a leading edge of a bonded portion.

FIG. 3 is a diagram for explaining a positional relationship between the leading edge of the resin impregnation portion 2a and the leading edge of the bonded portion 20, and which is illustrated by focusing on two hollow fiber membranes 2. The resin impregnation portion 2a formed in an end portion of each of the hollow fiber membrane 2 is formed in such a manner that the leading edge of the resin impregnation portion 2a toward the other end of each of the hollow fiber membranes 2 is located closer to the other end than a leading edge of the bonded portion toward the other end. In other words, the resin impregnation portion 2a is formed in such a manner that a length from an end surface of each of the hollow fiber membrane 2 to the leading end of the resin impregnation portion 2a is longer than a length from the end surface to the leading edge of the bonded portion 20. Here, the leading edge of the bonded portion 20 is a leading edge of a risen portion 21, which is formed by adhesive agent crept along the outer surface of the hollow fiber membrane 2. The leading edge of the bonded portion 20 is an edge point at which a length from the end surface of the hollow fiber membrane 2 is the longest.

A direct contact between the leading edge of the bonded portion 20 and the outer surface of the hollow fiber membrane 2, as described above, is avoidable by forming the resin impregnation portion 2a and the bonded portion 20 so as to satisfy such a relationship of lengths. Therefore, it is possible to prevent a damage to the hollow fiber membrane 2 in the vicinity of a bottom portion of the hollow fiber membrane 2 against the bonded portion 20.

Further, it is desirable that distance D between the leading edge of the resin impregnation portion 2a and the leading edge of the bonded portion 20 is 1 cm or longer in arithmetic mean, and 1 cm or longer and 5 cm or shorter in arithmetic mean is more desirable. A sufficient effect of protecting the outer surface of the hollow fiber membrane 2 by the resin impregnation portion 2a is achievable by setting distance D at 1 cm or longer. If the length of the resin impregnation portion 2a is too long, the effective area of the hollow fiber membranes 2 during filtration decreases. Therefore, it desirable that distance D is 5 cm or shorter. Regarding the distance between the leading edge of the resin impregnation portion 2a and the leading edge of the bonded portion 20, it is not necessary that the distance between the leading edge of the resin impregnation portion 2a and the leading edge of the bonded portion 20 is 1 cm or longer and 5 cm or shorter for all the hollow fiber membranes 2. An arithmetic mean of the distance between the leading edge of the resin impregnation portion 2a and the leading edge of the bonded portion 20 of all the hollow fiber membranes 2 should be 1 cm or longer and 5 cm or shorter. For example, the distance between the leading edge of the resin impregnation portion 2a and the leading edge of the bonded portion 20 in some of the hollow fiber membranes 2 may be not in the range of 1 cm or longer and 5 cm or shorter.

Further, as illustrated in FIG. 3, it is desirable that the resin impregnation portion 2a is formed only in the outer surface side of the hollow fiber membrane 2, and not formed in the inner surface side of the hollow fiber membrane 2. That is because if the resin impregnation portion is formed also in the inner surface side, the flexibility of the inner surface is lost. For example, when one of the hollow fiber membranes 2 in the hollow fiber membrane module 1 is damaged and broken, a leak restoration process, in which the hollow portion of the hollow fiber membrane 2 is sealed by a nail or the like, is carried out to prevent fluid from flowing into the hollow portion of the hollow fiber membrane 2. In this case, if the resin impregnation portion has been formed also in the inner surface side, it is difficult to carry out the restoration process, because the flexibility of the inner surface has been lost.

Further, it is desirable that the thickness of the resin impregnation portion 2a, which is formed only in the outer surface side, in the direction of the wall thickness of the hollow fiber membrane 2 is 10% or greater and 70% or less with respect to the thickness of the hollow fiber membrane 2. Further, 20% or greater and 70% or less is more desirable. A sufficient strength for preventing a fracture of the hollow fiber membrane 2 in the vicinity of the bottom portion of the hollow fiber membrane 2 against the bonded portion 20 during filtration or washing by backwash is securable by setting the thickness of the resin impregnation portion 2a in the direction of the wall thickness of the hollow fiber membrane 2 to 10% or greater. Further, when one of the hollow fiber membranes 2 in the hollow fiber membrane module 1 is damaged and broken, a leak restoration process, in which the hollow portion of the hollow fiber membrane 2 is sealed by a nail or the like, is carried out to prevent fluid from flowing into the hollow portion of the hollow fiber membrane 2, as described above. In this case, if the thickness of the resin impregnation portion 2a in the direction of the wall thickness of the hollow fiber membrane 2 is 100%, and the resin impregnation portion is formed also in the inner surface side, it is difficult to carry out the aforementioned restoration process, because the flexibility of the inner surface is lost. Therefore, the flexibility of the inner surface of the hollow fiber membrane is secured by setting the thickness of the resin impregnation portion 2a in the direction of the wall thickness of the hollow fiber membrane 2 to 70% or less.

Figure 4:
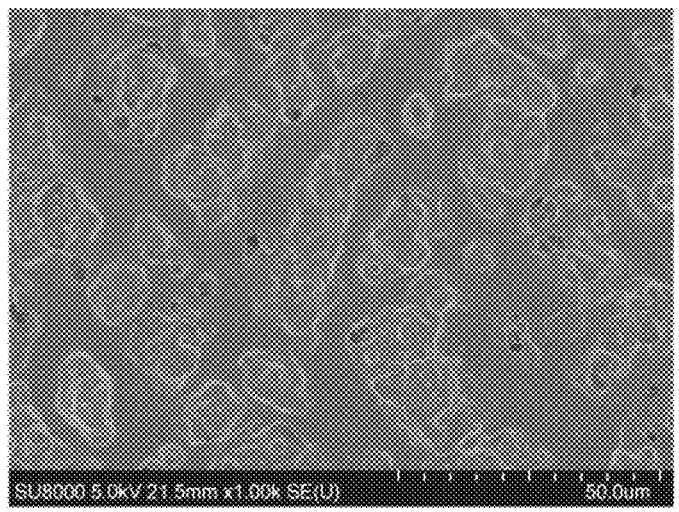
FIG. 4 is a diagram illustrating an SEM image of the outer surface of the resin impregnation portion.

FIG. 4 is a diagram illustrating an image of the outer surface of the resin impregnation portion 2a obtained by imaging the range of D, illustrated in FIG. 3, by an SEM (scanning electron microscope). In FIG. 4, a gray solid image part is a portion into which resin has penetrated, and penetration of resin into pores of the hollow fiber membranes 2 is observable. Further, as illustrated in FIG. 4, unevenness derived from the pores of the hollow fiber membrane 2 is recognizable in the SEM image of the outer surface of the resin impregnation portion 2a. In contrast, the outer surface of the risen portion of the bonded portion 20, which is not illustrated, is a smooth gray solid image, in which unevenness derived by pores is not recognizable.

Next, a process for producing the aforementioned hollow fiber membrane 1 will be described. In explanation of the process for producing the hollow fiber membrane module 1, a case in which epoxy resin is used will be described. However, the process is not limited to the case of using epoxy resin, and the hollow fiber membrane module 1 is producible by a similar process also when other resins are used. In the present embodiment, epoxy resin or polyurethane resin is used from the view point of heat resistance and chemical resistance.

Figure 5:
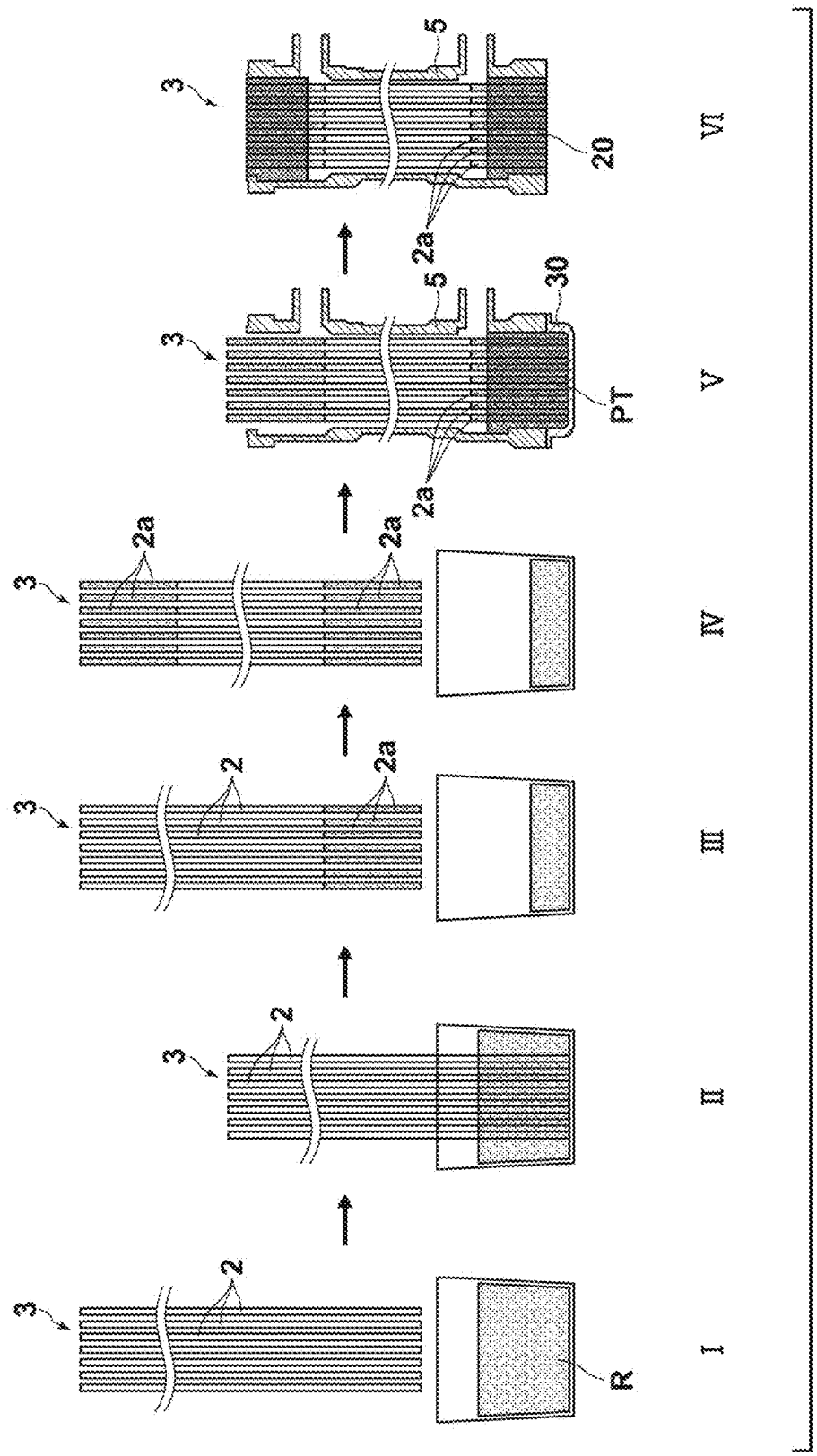
FIG. 5 is a diagram for explaining steps for producing a hollow fiber membrane module.
Figure 6:
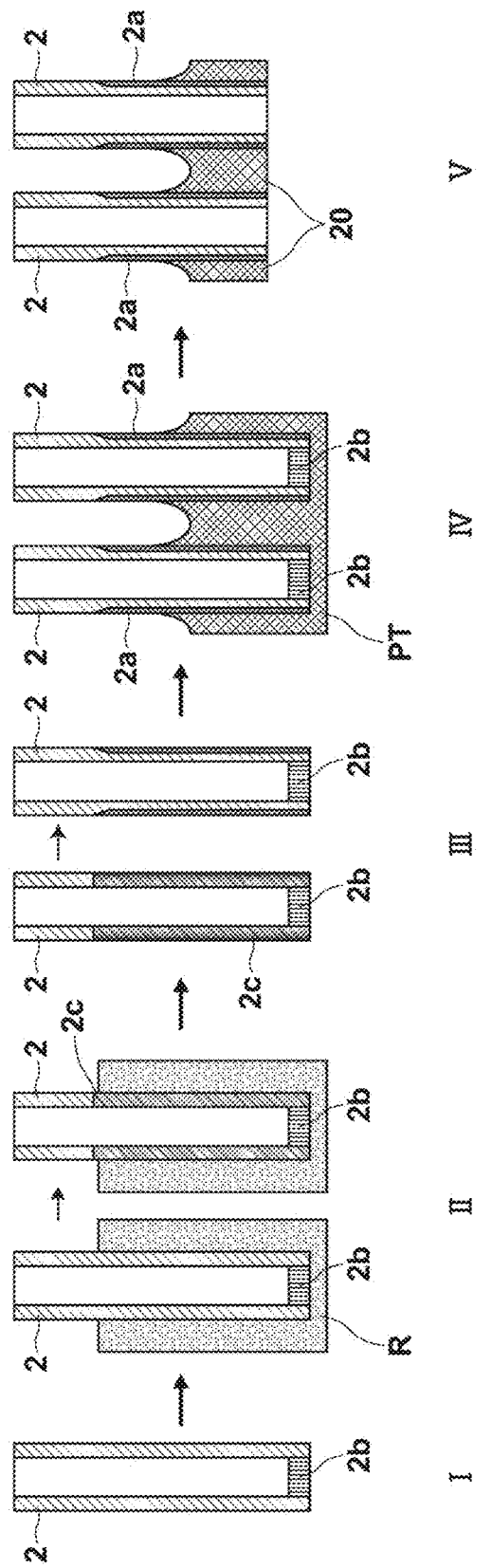
FIG. 6 is a diagram for explaining each of the steps illustrated in FIG. 5 in detail.

FIG. 5 is a diagram illustrating steps for producing the hollow fiber membrane module 1, and the steps advance in order in the direction of arrows illustrated in FIG. 5. Further, FIG. 6 is a diagram illustrating each of the steps illustrated in FIG. 5 in detail. In FIG. 6, a part of the hollow fiber membranes 2 are enlarged.

First, in step 1, illustrated in Section I of FIG. 5, a hollow fiber membrane bundle 3 is prepared by arranging a predetermined number of hollow fiber membranes 2 in a bundle. In this step 1, next, an opening of each of the hollow fiber membranes 2 of the hollow fiber membrane bundle 3 is closed by seal substance 2b, as illustrated in Section I of FIG. 6. Accordingly, the hollow portion of each of the hollow fiber membranes 2 is sealed. As the seal substance 2b, for example, gypsum is used. Alternatively, other material may be used.

Next, in step 2, illustrated in Section II of FIG. 5, an end portion of the hollow fiber membrane bundle 3 sealed by the seal substance 2b is dipped in epoxy resin solution R, diluted with organic solvent, for a predetermined time. After then, in step 3, illustrated in Section III of FIG. 5, the hollow fiber membrane bundle 3 is taken out from epoxy resin solution R, and dried. These step 2 and step 3 correspond to a preliminary step before bonding.

In the aforementioned step 2, after the hollow fiber membrane 2 is dipped in epoxy resin solution R, as illustrated in Section II of FIG. 6, epoxy resin solution R enters the hollow fiber membrane 2 through pores on the outer surface of the hollow fiber membrane 2. Further, the epoxy resin solution R permeates into the whole wall portion in the end portion of the hollow fiber membrane 2.

Here, the organic solvent, the dilution concentration of epoxy resin, the dip time, the viscosity of epoxy resin and the like used in the preliminary step before bonding should appropriately be selected, and not particularly limited.

Further, as the organic solvent for diluting epoxy resin used in the preliminary step before bonding, solvent having excellent volatility, such as alcohol and ketone, is desirable. In particular, it is desirable to use ethanol, 1-butanol or a mixture thereof. Here, there is a risk that the hollow fiber membranes 2 are dissolved by organic solvent, depending on the material of the hollow fiber membranes 2. Therefore, organic solvent that does not dissolve the hollow fiber membranes 2 is appropriately selected.

Drying conditions in the aforementioned step 3 is not particularly limited. Efficient dry is possible by creating an air flow and by appropriately adjusting the drying temperature.

In this step 3, the organic solvent used to dilute the epoxy resin preferentially volatilizes from the outer surface of the hollow fiber membrane 2. Further, while this organic solvent volatilizes, epoxy resin dissolved in the organic solvent is also drawn toward the outer surface side of the hollow fiber membrane 2. Accordingly, a dense layer, in which the epoxy resin has permeated, is formed in the outer surface side of the wall portion of the hollow fiber membrane 2. This dense layer corresponds to the resin impregnation portion 2a. Section III of FIG. 6 illustrates a state in which organic solvent gradually volatilizes from the outer surface of the hollow fiber membrane 2, and epoxy resin is drawn toward the outer surface side of the hollow fiber membrane 2.

The resin impregnation portion 2a is formed in the hollow fiber membrane 2 in this manner. Therefore, it is possible to prevent potting material, which will be used in a bonding step that will be described later, from entering the hollow portion of the hollow fiber membrane 2 through pores formed in the wall portion of the hollow fiber membrane 2. Specifically, in a case where the size of the pores in the hollow fiber membrane 2 is large, although it depends on the viscosity of the potting material and the bond method, which will be performed later, there is a risk that the potting material reaches the hollow portion of the hollow fiber membrane 2 and clogs the hollow fiber membrane 2 in the bonding step. The bonding step without clogging the hollow portion is performable by forming the resin impregnation portion 2a in advance in the preliminary step before bonding, as described above, even if the hollow fiber membrane 2 has such pores having large diameters.

Further, it was found out that the pores on the outer surface of the hollow fiber membrane 2 in which the resin impregnation portion 2a was formed in the preliminary step before bonding were not always completely filled with epoxy resin, and a part of the pores remained. In such a structure, an improvement of the bond strength by an anchor effect is expectable in the bonding step.

Further, it is desirable that the thickness of the resin impregnation portion 2a in the direction of the wall thickness of the hollow fiber membrane 2 is set to 10 to 70% with respect to the thickness of the hollow fiber membrane 2. The thickness of the resin impregnation portion 2a is controllable by the concentration of epoxy resin in the resin solution, and a target thickness is achievable by adjusting the concentration to 10 to 70 mass %.

Figure 7:
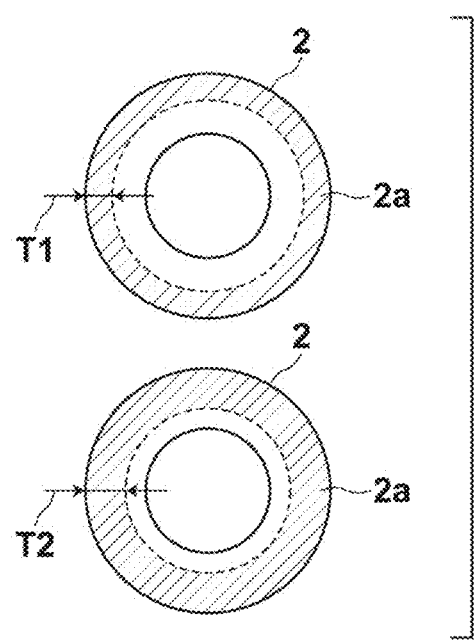
FIG. 7 is a diagram for explaining a relationship between the concentration of resin solution and the thickness of a resin impregnation portion in a preliminary step before bonding.

Specifically, as described above, the organic solvent used to dilute the epoxy resin preferentially volatilizes from the outer surface of the hollow fiber membrane 2, and epoxy resin dissolved in the organic solvent is drawn toward the outer surface side of the hollow fiber membrane 2 at the same time as this volatilization. As a result, the resin impregnation portion 2a is formed. Therefore, as the concentration of epoxy resin in the organic solvent is higher, more epoxy resin remains in the wall portion of the hollow fiber membrane 2, and the thickness of the resin impregnation portion 2a in the direction of the wall thickness becomes thicker. For example, in a case where the resin impregnation portion 2a is formed by using resin solution having a relatively low concentration, the thickness of the resin impregnation portion 2a in the direction of the wall thickness is T1, as illustrated in FIG. 7. In a case where the resin impregnation portion 2a is formed by using resin solution having a relatively high concentration, the thickness of the resin impregnation portion 2a in the direction of the wall thickness is T2, as illustrated in FIG. 7.

In the present embodiment, the concentration of epoxy resin in organic solvent is set to 10% or higher. That is because if the concentration of epoxy resin is less than 10%, there is a risk that the hollow portion of the hollow fiber membrane 2 is clogged by potting material in the bonding step.

In the preliminary step before bonding, the end portions of the hollow fiber membranes 2, as the hollow fiber membrane bundle 3, are impregnated with epoxy resin solution R, and dried. In this case, organic solvent tends not to volatilize from the outer surfaces of the hollow fiber membranes 2 that are in contact with each other. The organic solvent preferentially volatilizes from the outer surfaces of the hollow fiber membranes 2 that are not in contact with each other. Therefore, epoxy resin solution R moves from an outer surface side at which the hollow fiber membrane 2 is in contact with another hollow fiber membrane 2 toward an outer surface side at which the hollow fiber membrane 2 is not in contact with any hollow fiber membrane 2. Here, as epoxy resin solution R moves, epoxy resin dissolved in epoxy resin solution R also moves toward the outer surface side at which the hollow fiber membrane 2 is not in contact with any hollow fiber membrane 2, and the resin impregnation portion 2a is formed.

Meanwhile, the amount of epoxy resin decreases in the outer surface side at which the hollow fiber membrane 2 is in contact with another hollow fiber membrane 2. Therefore, a dense resin impregnation portion 2a is not formed in some cases. It is conceivable that the hollow portion is clogged in the bonding step, because potting material enters the hollow portion of the hollow fiber membrane 2 through this portion in which the impregnation portion 2a has not been formed.

In a case where the concentration of epoxy resin in epoxy resin solution R is set to 10% or higher, epoxy resin remains also in the outer surface side at which the hollow fiber membrane 2 is in contact with another hollow fiber membrane 2. Therefore, the resin impregnation portion 2a is formed, and potting material does not enter the hollow portion of the hollow fiber membrane 2 in the bonding step. Therefore, in the present embodiment, the resin impregnation portion 2a is formed in the outer surface side of all the hollow fiber membranes 2 by setting the concentration of epoxy resin in the organic solvent to 10% or higher. As a result, it is possible to prevent the hollow portion of the hollow fiber membrane 2 from being clogged by potting material.

Further, the concentration of epoxy resin in epoxy resin solution R is set so that the thickness of the resin impregnation portion 2a is 70% or less with respect to the thickness of the hollow fiber membrane 2. The concentration of epoxy resin is set in such a manner to prevent hollow fiber membranes 2 from firmly sticking to each other when the end portions of the hollow fiber membranes 2 that have been impregnated with epoxy resin solution R are dried in the preliminary step before bonding. If the concentration of epoxy resin in epoxy resin solution R is 70% or higher, hollow fiber membranes 2 firmly stick to each other when the end portions of the hollow fiber membranes 2 are dried in the preliminary step before bonding. Then, it becomes difficult to arrange plural hollow fiber membranes 2 in a cylindrical bundle so that the plural hollow fiber membranes 2 are insertable to a casing after the preliminary step before bonding. Further, if the hollow fiber membranes 2 that have firmly stuck to each other are detached from each other by force, a damage is caused to the hollow fiber membranes 2.

Further, in the preliminary step before bonding, after the end portions of the hollow fiber membranes 2 are dipped in epoxy resin solution R, and taken out, the step of drying epoxy resin solution R may be stopped before completion of the step of drying, and a state in which unreacted epoxy resin remains in the wall portions of the hollow fiber membranes 2 may be obtained. In such a state, the bonding step, which will be described later, may be performed by using epoxy resin as the potting material, and the unreacted epoxy resin present in the wall portions of the hollow fiber membranes 2 and the potting material may be cured at the same time. Accordingly, an epoxy group or an amino group in the epoxy resin that was unreacted in the preliminary step before bonding and an epoxy group or an amino group in the potting material used in the bonding step chemically bond, and strong bond is achievable. Further, if the same epoxy resin as the epoxy resin used in the preliminary step before bonding is used in the bonding step, more excellent bond strength is achievable. Further, in a case where the same epoxy resin is used in this manner, the coefficient of linear thermal expansion is the same. Therefore, there is no difference in the expansion amount and the contraction amount due to thermal cycle, and the thermal durability is improved. Further, since the same material is used in the preliminary step before bonding and in the bonding step, management of steps, such as mixture, becomes easy.

However, in a case where the heat resistance of a member, such as the casing 5, which is used in the hollow fiber membrane module 1 is not sufficient, heating up to a temperature required for perfect cure is not possible in some cases. In such cases, a structure having an increased cross-link density and improved chemical resistance is obtainable by heating the hollow fiber membrane bundle 3 at a high temperature to perform perfect cure after completing the preliminary step before bonding but before housing the hollow fiber membrane bundle 3 in the casing 5. In a case where epoxy resin is perfectly cured in the preliminary step before bonding, it is impossible to bond and cure the epoxy resin in such a manner to accompany chemical bond with potting material used in the bonding step. However, if the same epoxy resin is used, sufficient intermolecular force acts, and a required bond strength is maintainable.

Next, in step 4, illustrated in Section IV of FIG. 5, the resin impregnation portions 2a are formed at both ends of the hollow fiber membranes 2. After then, in step 5, illustrated in Section V of FIG. 5, the hollow fiber membrane bundle 3 in which the resin impregnation portions 2a have been formed is inserted to the casing 5. Further, the end portion of each of the hollow fiber membranes 2, in which the resin impregnation portion 2a has been formed, is bonded together by using potting material PT, and also the hollow fiber membrane bundle 3 and the casing 5 are bonded and fixed.

The hollow fiber membrane bundle 3 and the casing 5 may be bonded and fixed by centrifugal bonding, in which bond is performed while the casing 5 in which the hollow fiber membrane bundle 3 is housed is rotated in a horizontal direction, or by static bonding, in which the longitudinal direction of the casing 5 is arranged in the vertical direction, and potting material PT is injected from the lower end of the casing 5. In centrifugal bonding, it is possible to bond both ends of the hollow fiber membrane bundle 3 at the same time. However, a large amount of investment in equipment and electric power for high speed rotation are required.

Meanwhile, in static bonding, it is necessary to perform bond for one end and bond for the other end separately. Therefore, a longer time is required for bond, but an investment for large equipment is not required, and bond is performable by a simple tool. Here, a bond procedure by static bonding will be described.

Figure 8:
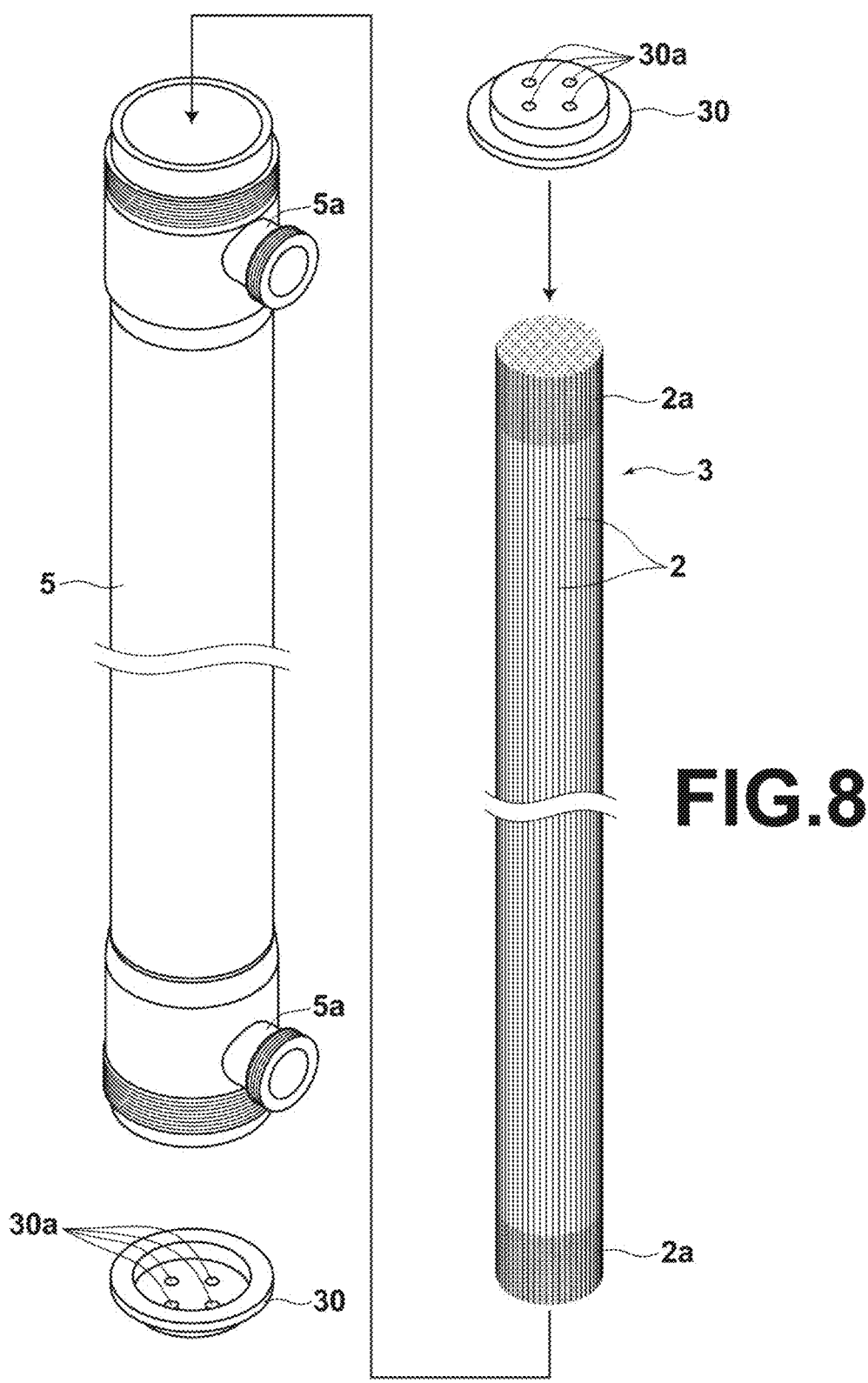
FIG. 8 is a diagram illustrating a structure for performing a bonding step.

As illustrated in FIG. 8, the hollow fiber membrane bundle 3 after the preliminary step before bonding is housed in the casing 5. Further, a bond cup 30 is attached to the lower end of the casing 5, and the attached bond cup 30 is fixed to the casing 5 by a nut 40 for fixing, as illustrated in FIG. 9.

An injection hole or holes 30a for injecting potting material PT are provided on the bond cup 30. Although the diameter of the injection hole 30a depends on the required injection speed of potting material PT, it is desirable that the diameter of the injection hole 30a is from 4 mm to 16 mm. Further, the number of the injection hole or holes 30a may be one. However, it is desirable that plural injection holes 30a are provided on the bottom of the bond cup 30 in such a manner to be evenly dispersed substantially in equidistance. In the present embodiment, four injection holes 30a are provided in such a manner to be evenly dispersed substantially in equidistance, as illustrated in FIG. 8.

Figure 9:
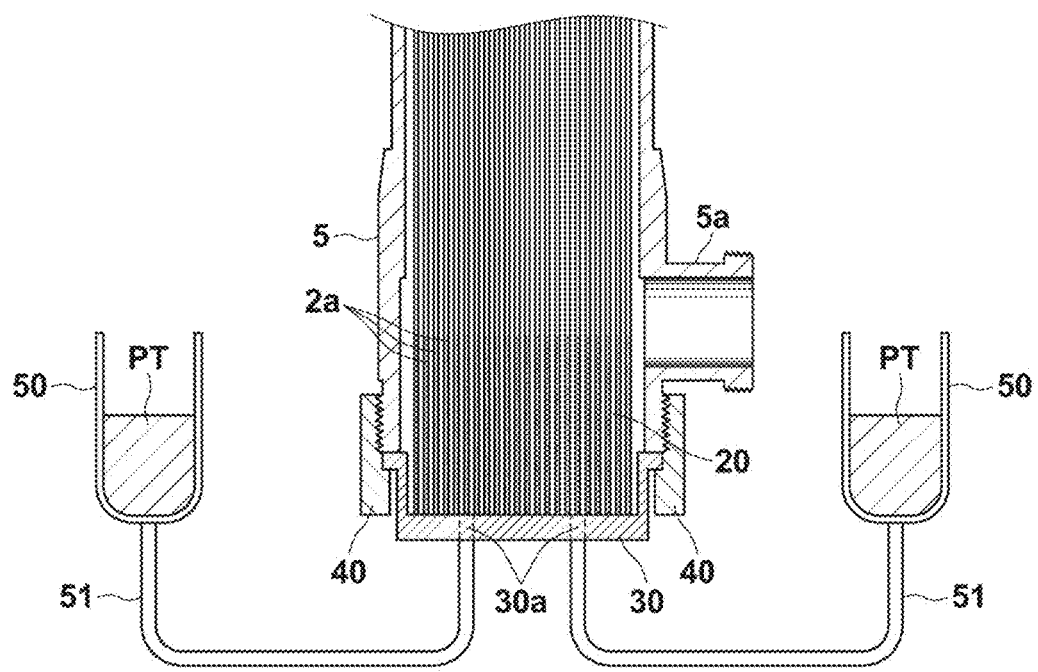
FIG. 9 is a diagram illustrating a configuration for performing static bonding.

After assembly in this manner, an end of an injection tube 51, the other end of which is connected to a potting material vessel 50, is inserted to the injection hole 30a on the bond cup 30, as illustrated in FIG. 9. Further, only a regulated amount of potting material PT in the potting material vessel 50 is injected to the casing 5 through the injection tube 51 and the injection hole 30a, and left until cured. Regarding the method for injecting potting material PT, potting material PT may be injected by its weight, or by pressurized force of gas by using a pump or the like. However, it is desirable to use a quantitative pump as the condition of injection is regeneratable. After potting material PT is cured, perfect cure at a high temperature may be performed, if necessary.

Next, after cure of potting material PT in the casing 5 is confirmed, the nut 40 for fixture and the bond cup 30 are removed. Then, in step 6, illustrated in Section VI of FIG. 5, the end portion of the hollow fiber membrane bundle 3 is opened by cutting the part closed by the seal substance 2b, as illustrated in Section V of FIG. 6.

Figure 10:
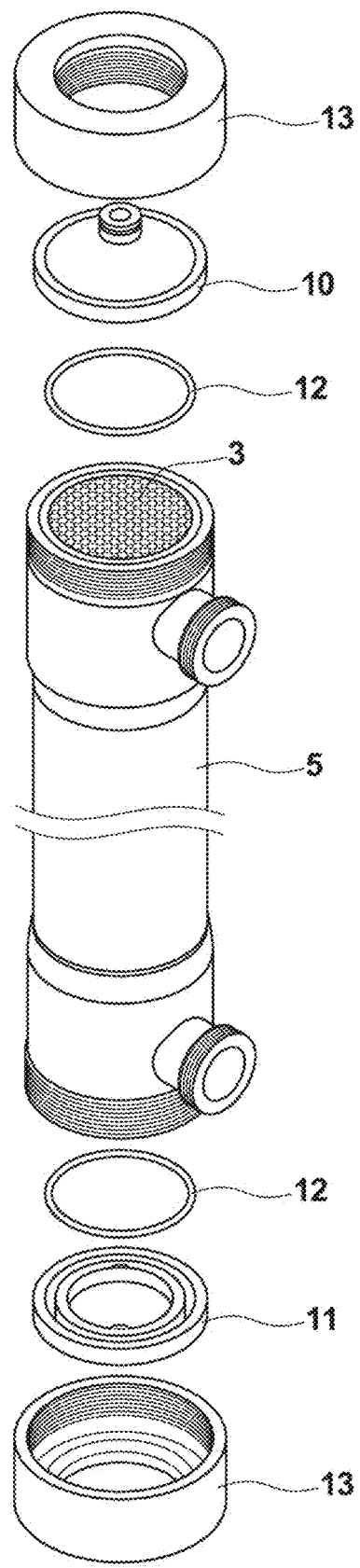
FIG. 10 is an exploded perspective view of a hollow fiber membrane module.

Finally, as illustrated in FIG. 10, caps 10, 11 for connecting piping are attached to the two end portions of the casing 5, in which the hollow fiber membrane bundle 3 has been bonded and fixed, through O-rings 12, respectively. After the caps 10, 11 for connecting piping are fastened and fixed by the nuts 13, a leak test, a trial operation and the like are performed. If production of the hollow fiber membrane module 1 as specified is confirmed, the hollow fiber membrane module 1 is completed. Here, in the hollow fiber membrane module 1 of the above embodiment, both end portions of the hollow fiber membrane bundle 3 are bonded and fixed by potting material PT. However, for example, if only an end portion of the hollow fiber membrane bundle is bonded and fixed, and the other end portion of the hollow fiber membrane bundle is sealed but neither bonded nor fixed, a resin impregnation portion should be provided only in the end portion to be bonded and fixed.

Next, a measurement method used in examples and comparative examples will be described.

(Average Pore Diameter on Inner Surface of Hollow Fiber Membrane)

The average pore diameter on the inner surface of the hollow fiber membrane 2 is measured as follows. First, the hollow fiber membrane 2 is cut in its longitudinal direction to expose the inner surface side of the hollow fiber membrane. In this state, the inner surface of the hollow fiber membrane 2 is imaged by using a scanning electron microscope about at a magnification that can clearly check the shape of as many pores as possible. Here, if the pore diameter is about from 0.1 µm to 50 µm, it is appropriate to use an electron microscope image at the magnification of about 500 times. Next, a transparent sheet is placed on a copy of the electron microscope image, and pore portions are completely colored in black by using a black pen or the like, and the transparent sheet is copied on white paper. Accordingly, the pore portions in black and non-pore portions in white are clearly distinguished. After then, the pore diameters of 100 arbitrarily selected pores are obtained by using commercially available image analysis software. The average pore diameter is calculated by obtaining the arithmetic mean of the pore diameters. For example, software "WinRoof", sold by MITANI CORPORATION may use used, as the image analysis software. Here, the pore diameter represents a distance connecting an arbitrary point on a circumference of a pore to a point on the circumference of the pore located at a position opposite to the arbitrary point.

(Average Pore Diameter in Wall Portion Between Inner Surface and Outer Surface of Hollow Fiber Membrane)

The average pore diameter in a wall portion between the inner surface and the outer surface of the hollow fiber membrane 2 is measured as follows. First, the hollow fiber membrane 2 is cut at a cross section perpendicular to the longitudinal direction of the hollow fiber membrane 2. Next, the hollow fiber membrane is divided, at the cross section, into three equal regions in the direction of its membrane thickness from its outer surface toward its inner surface. Further, a region including the outer surface is regarded as region a, a region including the inner surface is regarded as region c, and a region between region a and region c is regarded as region b. After then, the average pore diameter for each of the regions is obtained. For example, in a case where the average pore diameter of region a is obtained, a range within 10% of the whole membrane thickness from an arbitrary position in region a with respect to the direction of the membrane thickness is imaged by a scanning electron microscope. At this time, it is necessary to set the arbitrary position in region a so that the range within 10% of the whole membrane thickness from the arbitrary position is always located within region a. After then, the average diameter is calculated, based on the imaged image, in a similar manner to the method for measuring the average pore diameter on the inner surface of the hollow fiber membrane. Accordingly, the average pore diameter in region a is obtainable. The average pore diameters for region b and region c are also obtainable in a similar manner to region a.

(Blocking Pore Diameter of Hollow Fiber Membrane)

The blocking pore diameter of the hollow fiber membrane 2 is measured as follows. Filtration is performed by causing particle dispersion solution, in which particles having a uniform diameter are dispersed, to flow into a hollow portion of the hollow fiber membrane. At this time, the concentration of filtrate is measured while the particle diameter is changed stepwise in increments of 0.1 µm from 0.1 µm. The filtration blocking rate is obtained by comparing the concentration of the filtrate with the concentration of the particle dispersion solution before filtration. The particle diameter when the filtration blocking rate is 90% is determined as the blocking pore diameter.

(Glass Transition Temperatures of Resin Used to Form Resin Impregnation Portion and Resin Used as Potting Material)

The glass transition temperature of resin used to form the resin impregnation portion 2a and the glass transition temperature of resin used as the potting material were measured by using a differential scanning calorimeter (DSC) apparatus (Type Number: DSC8000) manufactured by PerkinElmer, Inc. The measurement method was based on the method for measuring a glass transition temperature defined in JIS K7121. Here, indium was used as reference substance.

Specifically, in the completed hollow fiber membrane module 1, about 5 mg of resin was collected from the bonded portion 20, and an appropriate amount of resin was collected from the resin impregnation portion 2a. The hollow fiber membrane 2 is included in the resin forming the resin impregnation portion 2a. Therefore, pre-processing for dissolving only the hollow fiber membrane 2 by organic solvent was performed in advance. Specifically, about 100 mL of dimethylformamide solution, which can dissolve polysulfone and PVDF that are the material of the hollow fiber membrane, was added to the collected resin forming the resin impregnation portion 2a, and ultrasonic washing was performed for 10 minutes. Here, the solvent for dissolving the hollow fiber membrane 2 is not limited to this, and should be appropriately selected. After first washing was finished, the dimethylformamide solution was replaced with new one, and a similar operation was performed further twice. After then, remaining undissolved resin was washed by ethanol, and dried in a dryer at 40° C. for 8 hours, and about 5 mg of resin was collected.

Next, the 5 mg of resin collected from the bonded portion 20 and the 5 mg of resin forming the resin impregnation portion 2a after the pre-processing were sealed in specialized sample containers, respectively. After the sample containers were set in the apparatus, the temperature in the apparatus was controlled to 20° C., and measurement was started. The temperature of the samples was raised in the range of 20° C. to 160° C. The speed of raising the temperature was 10° C./min. Midpoint glass transition temperatures (Tg) were calculated from obtained results, and the calculated values were determined as glass transition temperatures.

(Inner Diameter and Outer Diameter of Hollow Fiber Membrane)

The inner diameter and the outer diameter of the hollow fiber membrane 2 are obtained as follows. The hollow fiber membrane 2 was sliced in a direction perpendicular to the longitudinal direction of the membrane by a razor blade or the like. Then, the major axis and the minor axis for the inner diameter of a cross section and the major axis and the minor axis for the outer diameter of the cross section were measured by using a scanning electron microscope. Then, the inner diameter and the outer diameter were determined by using the following expressions (1), (2), respectively. In the present embodiment, regarding 20 hollow fiber membranes 2 that were arbitrarily selected, the inner diameter and the outer diameter of each of the hollow fiber membranes 2 were measured, and the inner diameter and the outer diameter were obtained by calculating arithmetic mean values of the measured values:

[Mathematical 1]

$$\text{Inner Diameter [mm]} = \frac{\text{Inner Major Axis [mm]} + \text{Inner Minor Axis [mm]}}{2}; \text{ and} \quad (1)$$

$$\text{Outer Diameter [mm]} = \frac{\text{Outer Major Axis [mm]} + \text{Outer Minor Axis [mm]}}{2}. \quad (2)$$

(Thickness of Hollow Fiber Membrane in Direction of Membrane Thickness)

The thickness of the hollow fiber membrane 2 in the direction of its membrane thickness is measured as follows. The inner diameter (A) and the outer diameter (B) of the hollow fiber membrane 2 were measured as described above, and the thickness of the hollow fiber membrane 2 was obtained by using the following expression (3):

$$\text{Membrane Thickness of Hollow Fiber Membrane } 2 = (B-A)/2 \quad (3).$$

In the present embodiment, 20 hollow fiber membranes 2 were arbitrarily selected, and the membrane thickness of each of the hollow fiber membranes 2 was measured, and the membrane thickness was obtained by calculating an arithmetic mean value of the measured values.

(Thickness of Resin Impregnation Portion in Direction of Membrane Thickness of Hollow Fiber Membrane)

The thickness of the resin impregnation portion 2a in the direction of the membrane thickness of the hollow fiber membrane 2 is measured as follows. First, a portion in which the resin impregnation portion 2a is formed in the hollow fiber membrane 2 is sliced in a direction perpendicular to the longitudinal direction of the membrane by a razor blade or the like, and this cross section is imaged by using a scanning electron microscope. Next, the resin impregnation portion 2a is identified based on the imaged cross-sectional image. In the cross-sectional image, no pore is recognizable in the resin impregnation portion 2a because pores of the hollow fiber membrane 2 are clogged by resin used in the preliminary step before bonding. However, the pores of the hollow fiber membrane 2 are recognizable in a portion in which the resin impregnation portion is not formed. Therefore, a boundary between the resin impregnation portion 2a and a region in which the resin impregnation portion 2a is not formed is identifiable based on whether any pore is recognizable in the cross-sectional image. After then, the inner diameter and the outer diameter of the resin impregnation portion 2a are obtained in a similar manner to the method for measuring the thickness of the hollow fiber membrane 2 in the direction of the membrane thickness, and the thickness of the resin impregnation portion 2a is calculated. In the present embodiment, 20 hollow fiber membranes 2 are arbitrarily selected, and the thickness of the resin impregnation portion 2a in the direction of the membrane thickness is measured in each of the hollow fiber membranes 2, and the thickness of the resin impregnation portion 2a is obtained by calculating an arithmetic mean value of the measured values.

EXAMPLES

Next, specific examples of the hollow fiber membrane module of the present disclosure and a method for producing the same of the present disclosure will be described with reference to the following Table 1 though Table 3.

Example 1

In Example 1, a porous hollow fiber membrane made of polysulfone having the average porosity of 70%, the average pore diameter on the inner surface of 30 μm, the blocking pore diameter of 0.4 μm, the inner diameter of 1.4 mm, the outer diameter of 2.3 mm and the wall thickness width of 450 μm was used. Further, epoxy resin of Momentive, Inc. (main agent: BisA-based epoxy resin (EPIKOTE828EL) and curing agent: aliphatic amine (EPIKURE9280) are mixed at the ratio of main agent:curing agent=100:51) was used as potting material. An initial viscosity immediately after mixture was about 800 mPas, and the viscosity was measured as defined in JIS K7215.

Next, a process for producing the hollow fiber membrane module of Example 1 will be described.

In a preliminary step before bonding, a resin solution the viscosity of which was adjusted to 20 mPa·s by adding 50 parts by mass of ethanol to 50 parts by mass of epoxy resin of Momentive, Inc. (main agent: BisA-based epoxy resin (EPIKOTE828EL) and curing agent: aliphatic amine (EPI-KURE9280) are mixed at the ratio of main agent:curing agent=100:51), and by evenly mixing them was used. A hollow fiber membrane bundle composed of 600 hollow fiber membranes bundled together, and the end portions of which were closed with gypsum in advance, was dipped in the resin solution for one minute in the state that the end of the hollow fiber membrane bundle was not fixed together. After then, ethanol was removed by air-drying the hollow fiber membrane bundle for 24 hours.

A cross section of the hollow fiber membrane after the preliminary step before bonding was observed by an SEM (scanning electron microscope), and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from an end surface of the hollow fiber membrane to a leading edge of the resin impregnation portion was 11 cm.

In a bonding step, 600 hollow fiber membranes after the preliminary step before bonding were used as a set, and 4 sets were inserted to a plastic casing. After then, static bonding was performed on both ends of the hollow fiber membrane bundle by using the potting material.

After then, heating was performed at 90° C. for 16 hours to perfectly cure the epoxy resin used in the preliminary step before bonding and the bonding step. Finally, a hollow fiber membrane module was produced by cutting and removing end portions of the bonded portions, and by attaching caps. A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

Here, regarding 20 hollow fiber membranes that have been arbitrary selected, the average values were obtained by measuring a length from an open end surface of each of the hollow fiber membranes in a state after cutting its end portion to the leading edge of the bonded portion (risen portion) and a length from the open end surface of each of the hollow fiber membranes to the leading edge of the resin impregnation portion, and by calculating arithmetic mean values of them.

Values were obtained similarly also in the following examples and comparative examples by calculating arithmetic mean values.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 1 was performed as follows.

First, caps attached to both end portions of the hollow fiber membrane module that had been hydrophilized with alcohol were removed. After then, the inside of the hollow fiber membrane module was filled with purified water by immersing the hollow fiber membrane module in a water bath.

Next, a tightly closed state was obtained by applying a plug or the like to one of nozzles, and the other nozzle was connected to piping for discharging air. Air flowed in from the opening of each of the hollow fiber membranes, and air pressure was gradually applied and increased to 0.1 MPa. Whether any air bubble was continuously output from the outer surface of the hollow fiber membranes was checked, but no air bubble was observed.

Further, regarding the hollow fiber membrane module produced in Example 1, hydrophilization process with alcohol was performed again. After then, a test of repeating filtration and backwash was performed as follows. Water to be processed was supplied to the hollow fiber membrane module at a flow rate so that the flow rate of filtration and backwash became 7.5 m$^3$/h (here, the filtration was inside-out filtration). A process of performing filtration and backwash for 60 s and 15 s, respectively, was regarded as one cycle, and an operation for 150000 cycles was performed. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 1, the durability for thermal cycle was checked. The temperature rising speed when the water temperature was raised from 20° C. to 75° C. was set to 40° C./min, and the temperature falling speed was set to 20° C./min. Further, the lengths of time kept at 75° C. and at 20° C. were 11 min, respectively. The process, as described above, was regarded as one cycle, and an operation of this cycle was continuously performed for 2500 cycles. After the operation, a leak test was performed again, and no air bubble from the outer surface of the hollow fiber membrane was observed. Further, it was also confirmed that no crack was generated in either the hollow fiber membranes or the bonded portions.

Example 2

In Example 2, hollow fiber membranes and organic solvent similar to those of Example 1 were used. However, epoxy resin having higher glass transition temperature than the epoxy resin used in Example 1 was used in the preliminary step before bonding and the bonding step. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 117° C. and the glass transition temperature of the epoxy resin forming the bonded portion was 120° C.

Further, a leak test on the hollow fiber membrane module produced in Example 2 was performed in a similar manner to Example 1. No air bubble from the outer surface of the hollow fiber membrane was observed.

Further, regarding the hollow fiber membrane module produced in Example 2, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 2, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 3

In Example 3, hollow fiber membranes, potting material and resin solution used in the preliminary step before bonding similar to those of Example 1 were used. However, 1-butanol was used as the organic solvent instead of ethanol. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 3 was performed in a similar manner to Example 1. No air bubble from the outer surface of the hollow fiber membrane was observed.

Further, regarding the hollow fiber membrane module produced in Example 3, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 3, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 4

In Example 4, hollow fiber membranes and resin solution used in the preliminary step before bonding similar to those of Example 1 were used. However, potting material was not epoxy resin, and polyurethane resin produced by Nippon Polyurethane Industry Co., Ltd. was used as the potting material. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of polyurethane resin forming the bonded portion were measured, and the glass transition temperature of the epoxy resin forming the resin impregnation portion was 82° C. and the glass transition temperature of the polyurethane resin forming the bonded portion was 75° C.

Further, a leak test on the hollow fiber membrane module produced in Example 4 was performed in a similar manner to Example 1. No air bubble from the outer surface of the hollow fiber membrane was observed.

Further, regarding the hollow fiber membrane module produced in Example 4, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 4, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 5

In Example 5, hollow fiber membranes and potting material similar to those of Example 1 were used. However, the concentration of the resin solution used in the preliminary step before bonding was set lower than the concentration used in Example 1, and the ratio of the thickness of the resin impregnation portion to the thickness of the wall portion of the hollow fiber membrane was controlled to 10%. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 10% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 10% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 5 was performed in a similar manner to Example 1. No air bubble from the outer surface of the hollow fiber membrane was observed.

Further, regarding the hollow fiber membrane module produced in Example 5, a test of repeating filtration and backwash was performed in a similar manner to Example 1. An operation for 100000 cycles was performed in Example 5. A leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 5, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 6

In Example 6, hollow fiber membranes and potting material similar to those of Example 1 were used. However, the concentration of the resin solution used in the preliminary step before bonding was set lower than the concentration used in Example 1, and the ratio of the thickness of the resin impregnation portion to the thickness of the wall portion of the hollow fiber membrane was controlled to 27%. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 27% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 27% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 6 was performed in a similar manner to Example 1. No air bubble from the outer surface of the hollow fiber membrane was observed.

Further, regarding the hollow fiber membrane module produced in Example 6, a test of repeating filtration and backwash was performed in a similar manner to Example 1. An operation for 150000 cycles was performed in Example 6. A leak test was performed again, and no air bubble from the outer surface of the hollow fiber membrane was observed. Meanwhile, in a case where an operation for 150000 cycles was performed in Example 5, and a leak test was performed again, an air bubble from the outer surface of a part of the hollow fiber membranes was observed, and a leakage from the hollow fiber membranes was found. As the above result shows, the durability improves further in the case where the ratio of the thickness of the resin impregnation portion to the thickness of the wall portion of the hollow fiber membrane is 27%, as in Example 6, than the case where the ratio is 10%, as in Example 5.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 6, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 7

In Example 7, hollow fiber membranes and potting material similar to those of Example 1 were used. However, the concentration of the resin solution used in the preliminary step before bonding was set higher than the concentration used in Example 1, and the ratio of the thickness of the resin impregnation portion to the thickness of the wall portion of the hollow fiber membrane was controlled to 56%. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 56% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 56% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 7 was performed in a similar manner to Example 1. No air bubble from the outer surface of the hollow fiber membrane was observed.

Further, regarding the hollow fiber membrane module produced in Example 7, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 7, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 8

In Example 8, hollow fiber membranes and potting material similar to those of Example 1 were used. However, the concentration of the resin solution used in the preliminary step before bonding was set even higher than the concentration used in Example 7, and the ratio of the thickness of the resin impregnation portion to the thickness of the wall portion of the hollow fiber membrane was controlled to 67%. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 67% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 67% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 8 was performed in a similar manner to Example 1. No air bubble from the outer surface of the hollow fiber membrane was observed.

Further, regarding the hollow fiber membrane module produced in Example 8, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 8, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 9

In Example 9, hollow fiber membranes, potting material and resin solution used in the preliminary step before bonding similar to those of Example 1 were used. However, in the preliminary step before bonding, the length of the resin impregnation portion from the end surface of the hollow fiber membrane was made longer than the length in Example 1. As a result, the distance between the leading edge of the resin impregnation portion and the leading edge of the bonded portion was made longer than the distance in Example 1. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 12 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 9.5 cm. In other words, a distance between the leading edge of the bonded portion and the leading edge of the resin impregnation portion was an average of 2 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 9 was performed in a similar manner to Example 1. No air bubble from the outer surface of the hollow fiber membrane was observed.

Further, regarding the hollow fiber membrane module produced in Example 9, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 9, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 10

In Example 10, hollow fiber membranes, potting material and resin solution used in the preliminary step before bonding similar to those of Example 1 were used. However, the distance between the leading edge of the resin impregnation portion and the leading edge of the bonded portion was made even longer than the distance in Example 9. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 13 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 10.5 cm. In other words, a distance between the leading edge of the bonded portion and the leading edge of the resin impregnation portion was an average of 3 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 40% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 10 was performed in a similar manner to Example 1. No air bubble from the outer surface of the hollow fiber membrane was observed.

Further, regarding the hollow fiber membrane module produced in Example 10, a test of repeating filtration and backwash was performed in a similar manner to Example 1. An operation for 150000 cycles was performed in a similar manner to Example 1. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 10, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 11

In Example 11, hollow fiber membranes made of material different from the material of hollow fiber membranes used in Example 1 through Example 10 were used. Specifically, porous hollow fiber membranes made of polyvinylidene difluoride (PVDF) having the average porosity of 60%, the average pore diameter on the inner surface of 0.2 μm, the blocking pore diameter of 0.2 μm, the inner diameter of 1.4 mm, the outer diameter of 2.0 mm and the wall thickness width of 300 μm were used. Further, potting material and resin solution used in the preliminary step before bonding similar to those of Example 1 were used. Besides, the number of hollow fiber membranes in a set of hollow fiber bundle in the preliminary step before bonding and the bonding step was not 600 but 1000. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 30% with respect to the thickness of the hollow fiber membrane. Further, a length from the end surface of the hollow fiber membrane to the leading edge of the resin impregnation portion was 11.5 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 9 cm. In other words, a distance between the leading edge of the bonded portion and the leading edge of the resin impregnation portion was an average of 1.5 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 30% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 11 was performed in a similar manner to Example 1. No air bubble from the outer surface of the hollow fiber membrane was observed.

Further, regarding the hollow fiber membrane module produced in Example 11, a test of repeating filtration and backwash was performed in a similar manner to Example 11. An operation for 300000 cycles was performed in Example 11. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 11, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Example 12

In Example 12, porous hollow fiber membranes made of polyvinylidene difluoride (PVDF) similar to Example 11 were used, and epoxy resin similar to Example 1 was used as potting material. Ethanol was not used as organic solvent, but 1-butanol was used. Besides, the number of hollow fiber membranes in a set of hollow fiber bundle in the preliminary step before bonding and the bonding step was not 600 but 1000. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 30% with respect to the thickness of the hollow fiber membrane. Further, a length from the end surface of the hollow fiber membrane to the leading edge of the resin impregnation portion was 11.5 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 9 cm. In other words, a distance between the leading edge of the bonded portion and the leading edge of the resin impregnation portion was an average of 1.5 cm.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 30% with respect to the thickness of the hollow fiber membrane.

Further, the glass transition temperature of epoxy resin forming the resin impregnation portion and the glass transition temperature of epoxy resin forming the bonded portion were measured, and the glass transition temperature of the epoxy resin forming the resin impregnation portion was 82° C. and the glass transition temperature of the epoxy resin forming the bonded portion was 84° C.

Further, a leak test on the hollow fiber membrane module produced in Example 12 was performed in a similar manner to Example 1. No air bubble from the outer surface of the hollow fiber membrane was observed.

Further, regarding the hollow fiber membrane module produced in Example 12, a test of repeating filtration and backwash was performed in a similar manner to Example 1. An operation for 300000 cycles was performed in Example 12. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 12, the durability for thermal cycle was checked, and no air bubble from the outer surface of the hollow fiber membrane was observed. Further, it was also confirmed that no crack was generated in either the hollow fiber membranes or the bonded portions.

Example 13

In Example 13, hollow fiber membranes and potting material similar to those of Example 11 were used. However, the concentration of the resin solution used in the preliminary step before bonding was set lower than the concentration used in Example 11, and the ratio of the thickness of the resin impregnation portion to the thickness of the wall portion of the hollow fiber membrane was controlled to 10%. Besides, the number of hollow fiber membranes in a set of hollow fiber bundle in the preliminary step before bonding and the bonding step was not 600 but 1000. Except that, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 10% with respect to the thickness of the hollow fiber membrane. Further, a length from the end surface of the hollow fiber membrane to the leading edge of the resin impregnation portion was 11.5 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 9 cm. In other words, a distance between the leading edge of the bonded portion and the leading edge of the resin impregnation portion was an average of 1.5 cm.

Cut end surfaces of the hollow fiber membranes were observed. Then, a state in which all of the hollow portions of the hollow fiber membranes were open was observed. Further, the thickness of the resin impregnation portion in the direction of the wall thickness of the hollow fiber membrane was observed at the cut end surface, and it was confirmed that the thickness of the resin impregnation portion was 10% with respect to the thickness of the hollow fiber membrane.

Further, the glass transition temperature of epoxy resin forming the resin impregnation portion and the glass transition temperature of epoxy resin forming the bonded portion were measured, and glass transition temperature of the epoxy resin forming the resin impregnation portion was 82° C. and the glass transition temperature of the epoxy resin forming the bonded portion was 84° C.

Further, a leak test on the hollow fiber membrane module produced in Example 13 was performed in a similar manner to Example 1. No air bubble from the outer surface of the hollow fiber membrane was observed.

Further, regarding the hollow fiber membrane module produced in Example 13, a test of repeating filtration and backwash was performed in a similar manner to Example 1. An operation for 150000 cycles was performed in Example 13. After then, a leak test was performed again, and no air bubble from the outer surface of the hollow fiber membrane was observed.

After then, the hollow fiber membrane module was disassembled, and the hollow fiber membranes were extracted. Further, the outer surface of the hollow fiber membranes was observed by a microscope, and no abnormality, such as a fracture and an abrasion, of the hollow fiber membranes was observed.

Further, the state of the hollow fiber membranes in the vicinity of the bonded portion was observed. Then, it was confirmed that adjacent hollow fiber membranes were independently present without firmly sticking to each other.

Further, regarding the hollow fiber membrane module produced in Example 13, the durability for thermal cycle was checked in a similar manner to Example 1, and no air bubble from the outer surface of the hollow fiber membrane was observed. Further, it was also confirmed that no crack was generated in either the hollow fiber membranes or the bonded portions.

Comparative Example 1

In Comparative Example 1, the porous hollow fiber membranes made of polysulfone and the potting material used in Example 1 were used. The porous hollow fiber membrane bundle was inserted to a casing without performing the preliminary step before bonding, and bonded and fixed. The conditions in the bonding step were similar to those of Example 1.

A cut end surface of the hollow fiber membrane bundle was observed. Then, a state in which substantially 100% of hollow portions of the hollow fiber membranes were clogged by epoxy resin used as potting material was observed. Further, since the epoxy resin penetrated into the hollow fiber membrane, heat generated during cure of the epoxy resin accumulated at a center of the end portion of the hollow fiber membrane module, compared with Example 1, and the temperature of heat generated during cure became high. Consequently, the color of the epoxy resin became burnt. Further, a residual stress in the bonded portion caused by cure became large, and a crack was generated in a part of an outer circumference portion.

Comparative Example 2

In Comparative Example 2, hollow fiber membranes and potting material similar to those of Example 1 were used. However, the concentration of the resin solution used in the preliminary step before bonding was set lower than the concentration used in Example 1, and the ratio of the thickness of the resin impregnation portion to the thickness of the wall portion of the hollow fiber membrane was controlled to 4%.

Cut end surfaces of the hollow fiber membranes were observed. Then, a state in which hollow portions of the hollow fiber membranes were clogged at about 200 positions was observed. A cut end surface of each of hollow fiber membranes in which obstruction was identified was observed by an SEM. Then, a state in which a portion in which the resin impregnation portion was formed and a portion in which the resin impregnation portion was not formed were mixed in the outer surface side of the hollow fiber membrane was confirmed. In other words, it is conceivable that potting material entered the hollow portion of the hollow fiber membrane through the portion in which the resin impregnation portion was not formed, and the hollow portion was clogged.

A cross section of each of hollow fiber membranes in which no obstruction was identified was observed by an SEM. Then, formation of a resin impregnation portion in the outer surface side of the hollow fiber membrane was confirmed. The thickness of the resin impregnation portion in the direction of the wall thickness was 4% with respect to the thickness of the hollow fiber membrane. Further, a length from an end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7.5 cm was obtained. Similarly, a length from the open end surface of each of the hollow fiber membranes to the leading edge of the resin impregnation portion was an average of 8.5 cm. In other words, a distance between the leading edge of the bonded portion and the leading edge of the resin impregnation portion was an average of 1 cm.

Further, a leak test on the hollow fiber membrane module produced in Comparative Example 2 was performed in a similar manner to Example 1. At this time, no air bubble from the outer surface of the hollow fiber membrane was observed.

Further, regarding the hollow fiber membrane module produced in Comparative Example 2, a test of repeating filtration and backwash was performed in a similar manner to Example 1. An operation for 100000 cycles was performed in Comparative Example 2. After then, a leak test was performed again. Then, an air bubble was output from the outer surface of the hollow fiber membrane, and a damage to the hollow fiber membrane was confirmed.

After then, the hollow fiber membrane module was disassembled, and the hollow fiber membranes were extracted. Further, the outer surface of the hollow fiber membranes was observed by a microscope, and a fracture and an abrasion of the hollow fiber membranes were observed.

Further, regarding the hollow fiber membrane module produced in Comparative Example 2, the durability for thermal cycle was checked in a similar manner to Example 1. In Comparative Example 2, after 800 cycles were performed continuously, a leak test was performed again. Then, an air bubble was output from the outer surface of the hollow fiber membrane, and a damage to the hollow fiber membrane was confirmed. The hollow fiber membrane module was disassembled to identify a leaked position. Then, a fracture of a hollow fiber membrane in the vicinity of the bonded portion was identified.

Comparative Example 3

In Comparative Example 3, hollow fiber membranes and potting material similar to those of Example 1 were used. However, the concentration of the resin solution used in the preliminary step before bonding was set higher than the concentration used in Example 1, and the ratio of the thickness of the resin impregnation portion to the thickness of the wall portion of the hollow fiber membrane was controlled to 80%.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 80% with respect to the thickness of the hollow fiber membrane. Further, a length from the end surface of the hollow fiber membrane to the leading edge of the resin impregnation portion was 11 cm.

In a bonding step, 600 hollow fiber membranes after the preliminary step before bonding were used as a set, and 4 sets were tried to be arranged in a hollow fiber membrane bundle. However, adjacent hollow fiber membranes firmly stick to each other by epoxy resin on their outer surfaces, and it was impossible to arrange the 4 sets in cylindrical shape so as to be insertable to the casing, and it was impossible perform the bonding step. Further, the firmly stuck hollow fiber membranes were tried to be separated from each other, and a crack was generated in the hollow fiber membrane, and a failure occurred.

Comparative Example 4

In Comparative Example 4, hollow fiber membranes, potting material and resin solution used in the preliminary step before bonding similar to those of Example 1 were used. Besides, the hollow fiber membrane module was produced by the same steps as those of Example 1.

A cross section of the hollow fiber membrane after the preliminary step before bonding was observed by an SEM, and formation of a resin impregnation portion in the outer surface side of the hollow fiber membrane was confirmed. The thickness of the resin impregnation portion in the direction of the wall thickness was 40% with respect to the thickness of the hollow fiber membrane. Further, a length from the end surface of the hollow fiber membrane to the leading edge of the resin impregnation portion was 11 cm.

A length from an open end surface of each of the hollow fiber membranes in a state after cutting its end portion to the leading edge of the bonded portion (risen portion) was measured, and an average of 7 cm was obtained. Similarly, a length from the open end surface of each of the hollow fiber membranes to the leading edge of the resin impregnation portion was also an average of 7 cm. In other words, a distance between the leading edge of the bonded portion and the leading edge of the resin impregnation portion was zero.

A cut end surface of the hollow fiber membrane bundle was observed. Then, a state in which all of the hollow portions of the hollow fiber membranes were open was observed. Further, the thickness of the resin impregnation portion in the direction of the wall thickness of the hollow fiber membrane was observed at the cut end surface. Then, the thickness of the resin impregnation portion was 71% with respect to the thickness of the hollow fiber membrane, which was higher than the ratio of the thickness of the resin impregnation portion observed at the time of the preliminary step before bonding. It is conceivable that the ratio was higher, because the height of a part of the resin of the potting material became higher than the height of the resin impregnation portion formed in the preliminary step before bonding as the potting material was supplied in such a manner that the liquid surface of the potting material and the position of the leading edge of the resin impregnation portion became the same. Since the potting material was supplied in such a manner, the potting material crept along the outer surface of the hollow fiber membrane, and as a result, the potting material permeated into the wall portion of the hollow fiber membrane. Further, it is conceivable that the length from the cut end surface of the hollow fiber membrane to the leading edge of the resin impregnation portion and the length from the cut end surface of the hollow fiber membrane to the leading edge of the bonded portion became the same by performing the bonding step in such a manner.

Further, regarding the hollow fiber membrane module produced in Comparative Example 4, a leak test was performed in a similar manner to Example 1. At this time, no air bubble from the outer surface of the hollow fiber membrane was observed.

Further, regarding the hollow fiber membrane module produced in Comparative Example 4, a test of repeating filtration and backwash was performed in a similar manner to Example 1. An operation for 10000 cycles was performed in Comparative Example 4. After then, a leak test was performed again. Then, leakage of air bubble from the outer surface of the hollow fiber membrane was observed at 20 positions.

After then, the hollow fiber membrane module was disassembled, and the hollow fiber membranes were extracted. Further, the outer surface of the hollow fiber membranes was observed by a microscope, and a crack of the hollow fiber membrane in the risen portion of the bonded portion was identified.

Further, regarding the hollow fiber membrane module produced in Comparative Example 4, the durability for thermal cycle was checked in a similar manner to Example 1. In Comparative Example 4, after 1000 cycles were performed continuously, a leak test was performed again. Then, an air bubble from the outer surface of the hollow fiber membrane was observed at 13 positions. The hollow fiber membrane module was disassembled, and the hollow fiber membrane in which a leakage occurred was precisely observed. Then, generation of a crack of the hollow fiber membrane in the risen portion of the bonded portion was identified.

Comparative Example 5

In Comparative Example 5, the porous hollow fiber membranes made of PVDF and the potting material used in Example 11 were used, and the hollow fiber membrane bundle was inserted to the casing without performing the preliminary step before bonding, and the hollow fiber membrane bundle was bonded and fixed. The conditions in the bonding step were similar to Example 11.

A cut end surface of the hollow fiber membrane bundle was observed. Then, a state in which substantially 100% of hollow portions of the hollow fiber membranes were clogged by the epoxy resin used as potting material was observed. Further, heat generated during cure became high in a similar manner to Comparative Example 1, and as a result, the color of the epoxy resin became burnt. Further, a residual stress in the bonded portion caused by cure became large, and a crack was generated in a part of an outer circumference portion.

TABLE 1

| | | Example 1 | Example 2 | Example 3 | Example 4 | Example 5 | Example 6 | Example 7 |
|---|---|---|---|---|---|---|---|---|
| Hollow Fiber Membrane Properties | Membrane Material | Polysulfone | Polysulfone | Polysulfone | Polysulfone | Polysulfone | Polysulfone | Polysulfone |
| | Inner Surface Pore Diameter (μm) | 30 | 30 | 30 | 30 | 30 | 30 | 30 |
| | Blocking Pore Diameter (μm) | 0.4 | 0.4 | 0.4 | 0.4 | 0.4 | 0.4 | 0.4 |
| | Inner Diameter (mm) | 1.4 | 1.4 | 1.4 | 1.4 | 1.4 | 1.4 | 1.4 |
| | Outer Diameter (mm) | 2.3 | 2.3 | 2.3 | 2.3 | 2.3 | 2.3 | 2.3 |
| | Wall Thickness (μm) | 450 | 450 | 450 | 450 | 450 | 450 | 450 |
| Resin Solution in Preliminary Step Before Bonding | Epoxy Resin Main Agent | BisA-Based Resin | BisA-Based Resin (High Tg) | BisA-Based Resin | BisA-Based Resin | BisA-Based Resin | BisA-Based Resin | BisA-Based Resin |
| | Cure Agent | Aliphatic Amine | Aliphatic Amine | Aliphatic Amine | Aliphatic Amine | Aliphatic Amine | Aliphatic Amine | Aliphatic Amine |
| | Organic Solvent | Ethanol | Ethanol | 1-Butanol | Ethanol | Ethanol | Ethanol | Ethanol |
| Preliminary Step Before Bonding | | Performed | Performed | Performed | Performed | Performed | Performed | Performed |
| Mixture Ratio of Resin Solution | Epoxy Resin (Parts by Mass) | 50 | 50 | 50 | 50 | 10 | 30 | 60 |
| | Dilution Solvent (Parts by Mass) | 50 | 50 | 50 | 50 | 90 | 70 | 40 |
| Structure of Resin Impregnation Portion After Preliminary Step Before Bonding | Length of Resin Impregnation Portion from End Surface (cm) | 11 | 11 | 11 | 11 | 11 | 11 | 11 |
| | Thickness of Resin Impregnation Portion (μm) | 180 | 180 | 180 | 180 | 45 | 120 | 250 |
| | Ratio of Resin Impregnation Portion/Wall Thickness Width (%) | 40 | 40 | 40 | 40 | 10 | 27 | 56 |
| | Potting Material | Epoxy Resin | Epoxy Resin | Epoxy Resin | Urethane Resin | Epoxy Resin | Epoxy Resin | Epoxy Resin |

TABLE 1-continued

|  |  | Example 1 | Example 2 | Example 3 | Example 4 | Example 5 | Example 6 | Example 7 |
|---|---|---|---|---|---|---|---|---|
| Shape After Cutting Step | Clogged Hollow Portion | None | None | None | None | None | None | None |
|  | Average Length From Open End Surface After Cutting End Portion to Leading Edge of Bonded Portion (cm) | 7.5 | 7.5 | 7.5 | 7.5 | 7.5 | 7.5 | 7.5 |
|  | Average Length From Open End Surface After Cutting End Portion to Leading Edge of Resin Impregnation Portion (cm) | 8.5 | 8.5 | 8.5 | 8.5 | 8.5 | 8.5 | 8.5 |
|  | Average Thickness of Resin Impregnation Portion (μm) | 180 | 180 | 180 | 180 | 45 | 120 | 250 |
|  | Ratio of Resin Impregnation Portion/Wall Thickness Width (%) | 40 | 40 | 40 | 40 | 10 | 27 | 56 |
| Filtration/Backwash Test | Cycle Number | 150000 | 150000 | 150000 | 150000 | 100000 | 150000 | 150000 |
|  | Leaked Hollow Fiber Membrane | None | None | None | None | None | None | None |
| Temperature Cycle Test | Cycle Number | 2500 | 2500 | 2500 | 2500 | 2500 | 2500 | 2500 |
|  | Leaked Hollow Fiber Membrane | None | None | None | None | None | None | None |
| Glass Transition Temperature | Bonded Portion | 84 | 120 | 84 | 75 | 84 | 84 | 84 |
|  | Resin Impregnation Portion | 82 | 117 | 82 | 82 | 82 | 82 | 82 |

TABLE 2

|  |  | Example 8 | Example 9 | Example 10 | Example 11 | Example 12 | Example 13 |
|---|---|---|---|---|---|---|---|
| Hollow Fiber Membrane Properties | Membrane Material | Polysulfone | Polysulfone | Polysulfone | PVDF | PVDF | PVDF |
|  | Inner Surface Pore Diameter (μm) | 30 | 30 | 30 | 0.2 | 0.2 | 0.2 |
|  | Blocking Pore Diameter (μm) | 0.4 | 0.4 | 0.4 | 0.2 | 0.2 | 0.2 |
|  | Inner Diameter (mm) | 1.4 | 1.4 | 1.4 | 1.4 | 1.4 | 1.4 |
|  | Outer Diameter (mm) | 2.3 | 2.3 | 2.3 | 2 | 2 | 2 |
|  | Wall Thickness Width (μm) | 450 | 450 | 450 | 300 | 300 | 300 |
| Resin Solution in Preliminary Step Before Bonding | Epoxy Resin Main Agent | BisA-Based Resin | BisA-Based Resin | BisA-Based Resin | BisA-Based Resin | BisA-Based Resin | BisA-Based Resin |
|  | Cure Agent | Aliphatic Amine | Aliphatic Amine | Aliphatic Amine | Aliphatic Amine | Aliphatic Amine | Aliphatic Amine |
|  | Organic Solvent | Ethanol | Ethanol | Ethanol | Ethanol | 1-Butanol | Ethanol |
|  | Preliminary Step Before Bonding | Performed | Performed | Performed | Performed | Performed | Performed |
| Mixture Ratio of Resin Solution | Epoxy Resin (Parts by Mass) | 70 | 50 | 50 | 50 | 50 | 10 |
|  | Dilution Solvent (Parts by Mass) | 30 | 50 | 50 | 50 | 50 | 90 |
| Structure of Resin Impregnation Portion After Preliminary Step Before Bonding | Length of Resin Impregnation Portion from End Surface (cm) | 11 | 12 | 13 | 11.5 | 11.5 | 11.5 |
|  | Thickness of Resin Impregnation Portion (μm) | 300 | 180 | 180 | 90 | 90 | 30 |
|  | Ratio of Resin Impregnation Portion/Wall Thickness Width (%) | 67 | 40 | 40 | 30 | 30 | 10 |
|  | Potting Material | Epoxy Resin | Epoxy Resin | Epoxy Resin | Epoxy Resin | Epoxy Resin | Epoxy Resin |
| Shape After Cutting Step | Clogged Hollow Portion | None | None | None | None | None | None |
|  | Average Length From Open End Surface After Cutting End Portion to Leading Edge of Bonded Portion (cm) | 7.5 | 7.5 | 7.5 | 7.5 | 7.5 | 7.5 |

TABLE 2-continued

|  |  | Example 8 | Example 9 | Example 10 | Example 11 | Example 12 | Example 13 |
| --- | --- | --- | --- | --- | --- | --- | --- |
|  | Average Length From Open End Surface After Cutting End Portion to Leading Edge of Resin Impregnation Portion (cm) | 8.5 | 9.5 | 10.5 | 9 | 9 | 9 |
|  | Average Thickness of Resin Impregnation Portion ($\mu$m) | 300 | 180 | 180 | 90 | 90 | 30 |
|  | Ratio of Resin Impregnation Portion/Wall Thickness Width (%) | 67 | 40 | 40 | 30 | 30 | 10 |
| Filtration/ Backwash Test | Cycle Number | 150000 | 150000 | 150000 | 300000 | 300000 | 150000 |
|  | Leaked Hollow Fiber Membrane | None | None | None | None | None | None |
| Temperature Cycle Test | Cycle Number | 2500 | 2500 | 2500 | 2500 | 2500 | 2500 |
|  | Leaked Hollow Fiber Membrane | None | None | None | None | None | None |
| Glass Transition Temperature | Bonded Portion | 84 | 84 | 84 | 84 | 84 | 84 |
|  | Resin Impregnation Portion | 82 | 82 | 82 | 82 | 82 | 82 |

TABLE 3

|  |  |  | Comparative Example 1 | Comparative Example 2 | Comparative Example 3 | Comparative Example 4 | Comparative Example 5 |
| --- | --- | --- | --- | --- | --- | --- | --- |
| Hollow Fiber Membrane Properties | Membrane Material | | Polysulfone | Polysulfone | Polysulfone | Polysulfone | PVDF |
|  | Inner Surface Pore Diameter ($\mu$m) | | 30 | 30 | 30 | 30 | 0.2 |
|  | Blocking Pore Diameter ($\mu$m) | | 0.4 | 0.4 | 0.4 | 0.4 | 0.2 |
|  | Inner Diameter (mm) | | 1.4 | 1.4 | 1.4 | 1.4 | 1.4 |
|  | Outer Diameter (mm) | | 2.3 | 2.3 | 2.3 | 2.3 | 2 |
|  | Wall Thickness Width ($\mu$m) | | 450 | 450 | 450 | 450 | 300 |
| Resin Solution in Preliminary Step Before Bonding | Epoxy Resin | Main Agent | BisA-Based Resin | BisA-Based Resin | BisA-Based Resin | BisA-Based Resin | BisA-Based Resin |
|  |  | Cure Agent | Aliphatic Amine | Aliphatic Amine | Aliphatic Amine | Aliphatic Amine | Aliphatic Amine |
|  | Organic Solvent | | Ethanol | Ethanol | Ethanol | Ethanol | Ethanol |
|  | Preliminary Step Before Bonding | | Not Performed | Performed | Performed | Performed | Not Performed |
| Mixture Ratio of Resin Solution | Epoxy Resin (Parts by Mass) | | — | 5 | 90 | 50 | — |
|  | Dilution Solvent (Parts by Mass) | | — | 95 | 10 | 50 | — |
| Structure of Resin Impregnation Portion After Preliminary Step Before Bonding | Length of Resin Impregnation Portion From End Surface (cm) | | — | 11 | 11 | 11 | — |
|  | Thickness of Resin Impregnation Portion ($\mu$m) | | — | 20 | 360 | 180 | — |
|  | Ratio of Resin Impregnation Portion/Wall Thickness Width (%) | | — | 4 | 80 | 40 | — |
| Shape After Cutting Step | Potting Material | | Epoxy Resin | Epoxy Resin | Epoxy Resin | Epoxy Resin | Epoxy Resin |
|  | Clogged Hollow Portion | | Present | Present | * Not Insertable to Case | None | Present |
|  | Average Length From Open End Surface After Cutting End Portion to Leading Edge of Bonded Portion (cm) | | 5 | 7.5 | — | 7 | 5.5 |
|  | Average Length From Open End Surface After Cutting End Portion to Leading Edge of Resin Impregnation Portion (cm) | | — | 8.5 | — | 7 | — |
|  | Average Thickness of Resin Impregnation Portion ($\mu$m) | | — | 20 | — | 320 | — |

TABLE 3-continued

|  |  | Comparative Example 1 | Comparative Example 2 | Comparative Example 3 | Comparative Example 4 | Comparative Example 5 |
|---|---|---|---|---|---|---|
|  | Ratio of Resin Impregnation Portion/Wall Thickness Width (%) | — | 4 | — | 71 | — |
| Filtration/ Backwash Test | Cycle Number | — | 100000 | — | 10000 | — |
|  | Leaked Hollow Fiber Membrane | — | Present | — | Present | — |
| Temperature Cycle Test | Cycle Number | — | 800 | — | 1000 | — |
|  | Leaked Hollow Fiber Membrane | — | Present | — | Present | — |

Next, an example of an embodiment in which the hollow fiber membrane module 1 according to the present embodiment is installed in a filtration apparatus 100 will be described with reference to FIG. 11. Further, a method for filtration using the hollow fiber membrane module 1 according to the present embodiment will be described. Here, a crossflow filtration method by inside-out filtration is assumed in this filtration apparatus 100.

The filtration apparatus 100 includes feed piping 101, which is connected to a tubular channel 11a of a cap 11 in the hollow fiber membrane module 1 and feeds water to be processed, and circulation piping 102, which is connected to a tubular channel 10a of a cap 10 and sends out circulation water. Further, pressure gauges Pi, Po, valves 101a, 102a and the like are arranged in the feed piping 101 and the circulation piping 102. Further, the filtration apparatus 100 includes an upper filtrate discharge tube 103 and a lower filtrate discharge tube 104, as flow channels of filtrate. The upper filtrate discharge tube 103 and the lower filtrate discharge tube 104 are connected to a junction tube 105 of filtrate. Further, the junction tube 105 communicates with external piping (not illustrated). Here, pressure gauge Pf a valve 105a and the like are arranged in the junction tube 105.

The hollow fiber membrane module 1 is arranged in an upright position. Further, an upper nozzle 5a is connected to the upper filtrate discharge tube 103, and a lower nozzle 5a is connected to the lower filtrate discharge tube 104.

Water to be processed is introduced, at predetermined pressure, from the feed piping 101 into the hollow fiber membrane module 1 through the tubular channel 11a. The water to be processed is introduced into a hollow portion of each of hollow fiber membranes 2, and filtered by the hollow fiber membranes 2. Further, the filtrate permeates out from the outer surface of each of the hollow fiber membranes 2. The filtrate is discharged to the junction tube 105 through the upper filtrate discharge tube 103 or the lower filtrate discharge tube 104, and collected through external piping. Meanwhile, water to be processed that has passed through the hollow fiber membranes 2 is discharged from the tubular channel 10a of the cap 10, as circulation water, and sent out to the circulation piping 102.

What is claimed is:

1. A hollow fiber membrane module comprising:
   a hollow fiber membrane bundle composed of a plurality of hollow fiber membranes bundled together,
   wherein the module includes a bonded portion in which the plurality of hollow fiber membranes are bonded and fixed together by potting material at least in an end portion of each of the plurality of hollow fiber membranes, and
   wherein each of the plurality of hollow fiber membranes has a resin impregnation portion in which resin is impregnated into an outer surface side of each of the plurality of hollow fiber membranes at least in the end portion where each of the plurality of hollow fiber membranes is bonded and fixed together, and
   wherein a leading edge of the resin impregnation portion toward the other end of each of the plurality of hollow fiber membranes is located closer to the other end than a leading edge of the bonded portion toward the other end in the end portion of each of the plurality of hollow fiber membranes, and
   wherein the thickness of the resin impregnation portion in the direction of the wall thickness of the hollow fiber membrane is 10 to 70% with respect to the thickness of the hollow fiber membrane.

2. The hollow fiber membrane module, as defined in claim 1,
   wherein a difference between the glass transition temperature of the potting material and the glass transition temperature of the resin forming the resin impregnation portion is 0° C. or higher and 10° C. or lower.

3. The hollow fiber membrane module, as defined in claim 1,
   wherein the glass transition temperature of the potting material and the resin forming the resin impregnation portion is 70° C. or higher.

4. The hollow fiber membrane module, as defined in claim 1,
   wherein the potting material and the resin forming the resin impregnation portion include at least one of epoxy resin, vinyl ester resin, urethane resin, unsaturated polyester resin, olefinic polymer, silicone resin, and fluorine-containing resin.

5. The hollow fiber membrane module, as defined in claim 1,
   wherein the potting material is epoxy resin, and
   the resin forming the resin impregnation portion is the same as the potting material.

6. The hollow fiber membrane module, as defined in claim 1,
   wherein a distance between the leading edge of the bonded portion toward the other end and the leading edge of the resin impregnation portion toward the other end is 1 cm or longer in arithmetic mean.

7. The hollow fiber membrane module, as defined in claim 1,
   wherein a distance between the leading edge of the bonded portion toward the other end and the leading edge of the resin impregnation portion toward the other end is 1 cm or longer and 5 cm or shorter in arithmetic mean.

8. The hollow fiber membrane module, as defined in claim 1,
wherein in the plurality of hollow fiber membranes,
an average pore diameter on an inner surface of the hollow fiber membrane is 1 to 50 μm, and
a blocking pore diameter of the hollow fiber membrane is 0.1 to 1 μm, and
wherein average pore diameter Pa of region a, average pore diameter Pb of region b and average pore diameter Pc of region c satisfy the following relationship:

$$Pa<Pb<Pc,$$

where
a region including an outer surface of the hollow fiber membrane is region a,
a region including an inner surface of the hollow fiber membrane is region c, and
a region between region a and region c is region b, in a case where the hollow fiber membrane is divided, in the direction of its membrane thickness from its outer surface toward its inner surface, into three equal regions a to c.

9. A method for producing a hollow fiber membrane module including a hollow fiber membrane bundle composed of a plurality of hollow fiber membranes bundled together,
the method comprising:
a preliminary step before bonding, in which a resin impregnation portion is formed in an outer surface side of each of the hollow fiber membranes by dipping at least an end portion of each of the hollow fiber membranes in resin solution obtained by diluting resin with organic solvent, and after then by drying the dipped portion; and
a bonding step, in which a bonded portion is formed, after the preliminary step before bonding, by bonding and fixing the end portion including the resin impregnation portion of each of the plurality of hollow fiber membranes together by potting material,
wherein the concentration of resin in the resin solution used in the preliminary step before bonding is 10 to 70 mass %, and
wherein in the bonding step, the bonded portion is formed in such a manner that a leading edge of the resin impregnation portion toward the other end of each of the plurality of hollow fiber membranes is located closer to the other end than a leading edge of the bonded portion toward the other end in the end portion of each of all the plurality of hollow fiber membranes.

10. The method for producing a hollow fiber membrane module, as defined in claim 9,
wherein a difference between the glass transition temperature of the potting material and the glass transition temperature of the resin forming the resin impregnation portion is 0° C. or higher and 10° C. or lower.

11. The method for producing a hollow fiber membrane module, as defined in claim 9,
wherein the glass transition temperature of the potting material and the resin forming the resin impregnation portion is 70° C. or higher.

12. The method for producing a hollow fiber membrane module, as defined in claim 9,
wherein the potting material and the resin forming the resin impregnation portion include at least one of epoxy resin, vinyl ester resin, urethane resin, unsaturated polyester resin, olefinic polymer, silicone resin, and fluorine-containing resin.

13. The method for producing a hollow fiber membrane module, as defined in claim 9,
wherein the potting material is epoxy resin, and
the resin forming the resin impregnation portion is the same as the potting material.

14. The method for producing a hollow fiber membrane module, as defined in claim 9,
wherein a distance between the leading edge of the bonded portion toward the other end and the leading edge of the resin impregnation portion toward the other end is 1 cm or longer in arithmetic mean.

15. The method for producing a hollow fiber membrane module, as defined in claim 9,
wherein the bonded portion is formed in the bonding step in such a manner that a distance between the leading edge of the bonded portion toward the other end and the leading edge of the resin impregnation portion toward the other end is 1 cm or longer and 5 cm or shorter in arithmetic mean.

16. The method for producing a hollow fiber membrane module, as defined in claim 9,
wherein the organic solvent is alcohol.

17. The method for producing a hollow fiber membrane module, as defined in claim 9,
wherein the organic solvent is ethanol, 1-butanol or a mixture thereof.

18. The method for producing a hollow fiber membrane module, as defined in claim 9,
wherein in the plurality of hollow fiber membranes,
an average pore diameter on an inner surface of the hollow fiber membrane is 1 to 50 μm, and
a blocking pore diameter of the hollow fiber membrane is 0.1 to 1 μm, and
wherein average pore diameter Pa of region a, average pore diameter Pb of region b and average pore diameter Pc of region c satisfy the following relationship:

$$Pa<Pb<Pc,$$

where
a region including an outer surface of the hollow fiber membrane is region a,
a region including an inner surface of the hollow fiber membrane is region c, and
a region between region a and region c is region b, in a case where the hollow fiber membrane is divided, in the direction of its membrane thickness from its outer surface toward its inner surface, into three equal regions a to c.

* * * * *